(12) United States Patent
Rico Alvarino et al.

(10) Patent No.: US 11,044,709 B2
(45) Date of Patent: Jun. 22, 2021

(54) POWER SAVINGS FOR DOWNLINK CHANNEL MONITORING IN NARROWBAND SYSTEMS

(71) Applicant: QUALCOMM Incorporated, San Diego, CA (US)

(72) Inventors: Alberto Rico Alvarino, San Diego, CA (US); Sharad Deepak Sambhwani, San Diego, CA (US); Juan Montojo, San Diego, CA (US); Hao Xu, San Diego, CA (US); Durga Prasad Malladi, San Diego, CA (US); Xiao Feng Wang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/454,966

(22) Filed: Mar. 9, 2017

(65) Prior Publication Data
US 2017/0265171 A1 Sep. 14, 2017

Related U.S. Application Data

(60) Provisional application No. 62/307,415, filed on Mar. 11, 2016.

(51) Int. Cl.
*H04W 52/02* (2009.01)
*H04W 72/04* (2009.01)
*H04L 5/00* (2006.01)

(52) U.S. Cl.
CPC ......... *H04W 72/042* (2013.01); *H04L 5/0048* (2013.01); *H04W 52/0216* (2013.01); *H04W 52/0229* (2013.01); *Y02D 30/70* (2020.08)

(58) Field of Classification Search
None
See application file for complete search history.

(56) References Cited

U.S. PATENT DOCUMENTS 9,693,307 B2 * 6/2017 Katz ................ H04W 52/0245
2008/0085680 A1 * 4/2008 Kim .................... H04W 76/048
455/69

(Continued)

FOREIGN PATENT DOCUMENTS

CN 102917378 A 2/2013
CN 104969600 A 10/2015

OTHER PUBLICATIONS

3GPP TS 36.213: "3rd Generation Partnership Project; Technical Specification Group Radio Access Network; Evolved Universal Terrestrial Radio Access (E-UTRA); Physical Layer Procedures", Release 10, V10.1.0, Mar. 1, 2011 (Mar. 1, 2011), pp. 1-115, XP055363638, [retrieved on Apr. 11, 2017].

(Continued)

*Primary Examiner* — Ajit Patel
(74) *Attorney, Agent, or Firm* — Patterson + Sheridan, LLP

(57) ABSTRACT

Aspects of the present disclosure provide techniques and apparatus for power savings for control channel monitoring for enhanced machine type communications (eMTC). In one aspect, a method is provided which may be performed by a wireless device such as a low cost wireless device, which may be user equipment (UE) or an eMTC UE. The method generally includes determining whether a downlink channel is present in a subframe; and causing the UE to enter a low power mode for a duration based on a determination that the downlink channel is not present in the subframe.

37 Claims, 22 Drawing Sheets

(56) References Cited

U.S. PATENT DOCUMENTS

| | | | |
|---|---|---|---|
| 2011/0044261 A1* | 2/2011 | Cai | H04L 5/0053 370/329 |
| 2011/0045763 A1* | 2/2011 | Mohanty | H04W 80/04 455/7 |
| 2012/0163305 A1* | 6/2012 | Nimbalker | H04W 52/0206 370/329 |
| 2013/0194995 A1 | 8/2013 | Reinhardt et al. | |
| 2013/0250782 A1* | 9/2013 | Nimbalker | H04L 1/0038 370/252 |
| 2014/0112252 A1* | 4/2014 | Hoymann | H04W 72/0446 370/328 |
| 2014/0204921 A1* | 7/2014 | Jitsukawa | H04L 5/0044 370/336 |
| 2014/0376472 A1* | 12/2014 | Yu | H04W 52/322 370/329 |
| 2015/0029923 A1* | 1/2015 | Xu | H04W 76/28 370/311 |
| 2015/0092893 A1* | 4/2015 | Tabet | H04L 27/2647 375/340 |
| 2015/0201376 A1 | 7/2015 | Webb et al. | |
| 2015/0270939 A1* | 9/2015 | Ro | H04L 5/0051 370/329 |
| 2016/0014716 A1* | 1/2016 | Tabet | H04W 68/005 455/458 |
| 2016/0119103 A1* | 4/2016 | Yu | H04W 76/27 370/329 |
| 2016/0135231 A1* | 5/2016 | Lee | H04W 68/12 370/329 |
| 2016/0192331 A1* | 6/2016 | Liang | H04L 5/0048 370/329 |
| 2016/0212709 A1* | 7/2016 | Park | H04W 52/0216 |
| 2016/0381588 A1* | 12/2016 | Strobl | H04W 24/10 455/67.11 |
| 2017/0127411 A1* | 5/2017 | Miao | H04W 72/042 |
| 2017/0171839 A1* | 6/2017 | Larijani | H04W 72/042 |
| 2017/0187474 A1* | 6/2017 | Bin Sediq | H04W 52/0225 |
| 2017/0238260 A1* | 8/2017 | Kim | H04W 52/04 455/522 |
| 2017/0325164 A1* | 11/2017 | Lee | H04W 52/0216 |
| 2018/0035411 A1* | 2/2018 | Wang | H04W 72/042 |
| 2018/0042032 A1* | 2/2018 | Yuan | H04W 72/1252 |
| 2018/0049154 A1* | 2/2018 | Choi | H04W 76/10 |
| 2018/0242318 A1* | 8/2018 | Christensson | H04W 52/0206 |

OTHER PUBLICATIONS

International Search Report and Written Opinion—PCT/US2017/021740—ISA/EPO—dated Jun. 19, 2017.
Panasonic: "Timing design of NB-IoT", 3GPP Draft, 3GPP TSG RAN WG1 Meeting #84, R1-161003, St Julian's, Malta, Feb. 15-19, 2016, Feb. 5, 2016, pp. 1-3.

* cited by examiner

POWER SAVINGS FOR DOWNLINK CHANNEL MONITORING IN NARROWBAND SYSTEMS

CROSS-REFERENCE TO RELATED APPLICATION & PRIORITY CLAIM

This application claims benefit of and priority to U.S. Provisional Patent Application Ser. No. 62/307,415, filed Mar. 11, 2016, which is herein incorporated by reference in its entirety for all applicable purposes.

BACKGROUND

Field of the Disclosure

Certain aspects of the present disclosure generally relate to wireless communications and, more particularly, to power savings for downlink channel monitoring in narrowband systems, such as enhanced machine type communications (eMTC) systems.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced (LTE-A) systems and orthogonal frequency division multiple access (OFDMA) systems.

Generally, a wireless multiple-access communication system can simultaneously support communication for multiple wireless terminals. Each terminal communicates with one or more base stations (BSs) via transmissions on the forward and reverse links. The forward link (or downlink) refers to the communication link from the BSs to the terminals, and the reverse link (or uplink) refers to the communication link from the terminals to the BSs. This communication link may be established via a single-input single-output, multiple-input single-output or a multiple-input multiple-output (MIMO) system.

A wireless communication network may include a number of BSs that can support communication for a number of wireless devices. Wireless devices may include user equipments (UEs). Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Wireless devices may include narrowband Internet-of-Things (NB-IoT) devices. IoT may refer to a network of physical objects, devices, or "things". IoT devices may be embedded with, for example, electronics, software, or sensors and may have network connectivity, which enable these devices to collect and exchange data.

Some next generation, NR, or 5G networks may include a number of BSs, each simultaneously supporting communication for multiple communication devices, such as UEs. In LTE or LTE-A networks, a set of one or more BSs may define an e NodeB (eNB). In other examples (e.g., in a next generation or 5G network), a wireless multiple access communication system may include a number of distributed units (e.g., edge units (EUs), edge nodes (ENs), radio heads (RHs), smart radio heads (SRHs), transmission reception points (TRPs), etc.) in communication with a number of central units (e.g., CU, central nodes (CNs), access node controllers (ANCs), etc.), where a set of one or more distributed units (DUs), in communication with a CU, may define an access node (e.g., AN, a new radio base station (NR BS), a NR NB, 5G NB, a network node, a gNB, a 5G BS, an access point (AP), a transmission reception point (TRP), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. NR (e.g., 5G radio access) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, MIMO antenna technology, and carrier aggregation.

However, as the demand for mobile broadband access continues to increase, there exists a need for further improvements in LTE, MTC, IoT, and NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to power savings for downlink channel monitoring in narrowband systems, such as enhanced machine type communications (eMTC) systems.

Certain aspects of the present disclosure provide a method, performed by a wireless device, such as a user equipment (UE). The method generally includes determining whether a downlink channel is present in a subframe; and causing the UE to enter a low power mode for a duration based on a determination that the downlink channel is not present in the subframe.

Certain aspects of the present disclosure provide a method, performed by a wireless node, such as a base station (BS). The method generally includes determining whether a downlink channel for a UE is present in a subframe; and transmitting signaling to the UE indicating whether the downlink channel is present in the subframe.

Certain aspects of the present disclosure provide an apparatus, such as a wireless device. The apparatus generally includes means for determining whether a downlink channel is present in a subframe; and means for causing the apparatus to enter a low power mode for a duration based on a determination that the downlink channel is not present in the subframe.

Certain aspects of the present disclosure provide an apparatus, which can be a wireless node. The apparatus generally includes means for determining whether a downlink channel for a UE is present in a subframe; and means for transmitting signaling to the UE indicating whether the downlink channel is present in the subframe.

Certain aspects of the present disclosure provide an apparatus, such as a wireless device. The apparatus generally includes at least one processor configured to determine whether a downlink channel is present in a subframe and cause the apparatus to enter a low power mode for a duration based on a determination that the downlink channel is not present in the subframe; and a memory coupled with the at least one processor.

Certain aspects of the present disclosure provide an apparatus, which can be a wireless node. The apparatus generally includes at least one processor configured to determine whether a downlink channel for a UE is present in a subframe; and a transmitter configured to transmit signaling to the UE indicating whether the downlink channel is present in the subframe.

Certain aspects of the present disclosure provide a computer readable medium having computer executable code stored thereon for wireless communications by a UE. The computer executable code generally includes code for determining whether a downlink channel is present in a subframe; and code for causing the UE to enter a low power mode for a duration based on a determination that the downlink channel is not present in the subframe.

Certain aspects of the present disclosure provide a computer readable medium having computer executable code stored thereon for wireless communications by a BS. The computer executable code generally includes code for determining whether a downlink channel for a UE is present in a subframe; and code for transmitting signaling to the UE indicating whether the downlink channel is present in the subframe.

Numerous other aspects are provided including methods, apparatus, systems, computer program products, computer-readable medium, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
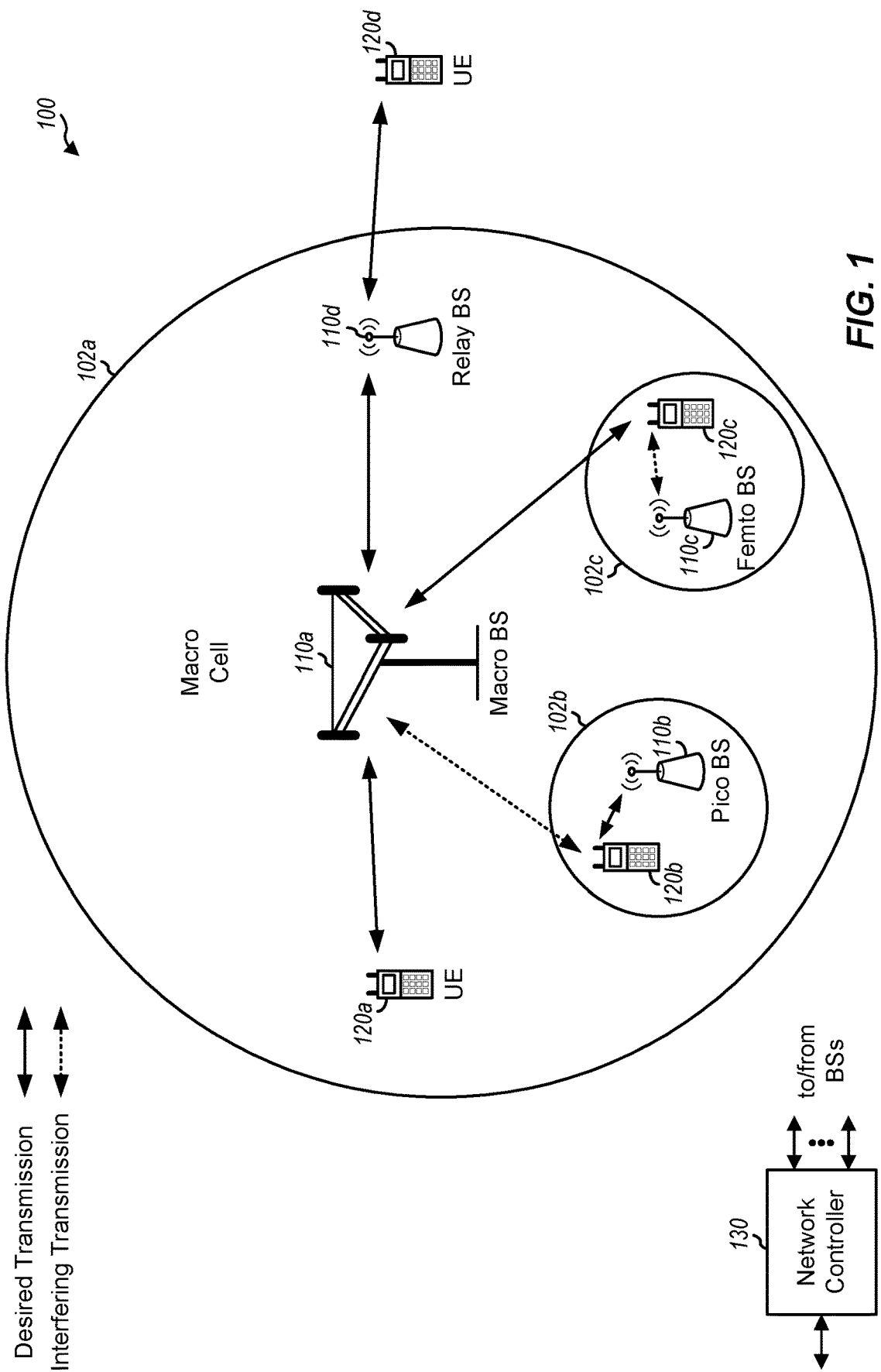
FIG. 1 is a block diagram conceptually illustrating an example of a wireless communication network, in accordance with certain aspects of the present disclosure.

Aspects of the present disclosure provide techniques for power savings for control channel monitoring in enhanced machine type communications (eMTC). According to certain aspects, a user equipment (UE), which may be a low cost device such as an eMTC UE, may determine (e.g., within one or more narrowband regions within a wider system bandwidth), whether a downlink channel (e.g., a control channel such as an enhanced physical downlink control channel (EPDCCH) or MTC PDDCH (MPDCCH)) is present in a subframe. The UE may enter a low power mode (e.g., micro-sleep) for a duration (e.g., the remainder of the subframe) based on a determination that the downlink channel is not present in the subframe. The determination can be made based on detection of demodulation reference signals (DMRS) in the subframe, energy detection of decoding candidate frequency tones in the subframe, and/or reception of signaling from the base station (BS) indicating whether the downlink control channel is present in the subframe (e.g., via a new signaling channel which may be called a Physical Control Presence Indicator Channel (PCPICH)).

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TDSCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (WiFi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use EUTRA, which employs OFDMA on the downlink and SCFDMA on the uplink. UTRA, EUTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. Certain aspects of the techniques are described below for LTE/LTE-Advanced (LTE-A), and LTE/LTE-A terminology is used in much of the description below. LTE and LTE-A are referred to generally as LTE.

It is noted that while aspects may be described herein using terminology commonly associated with 3G and/or 4G wireless technologies, aspects of the present disclosure can be applied in other generation-based communication systems, such as NR networks including 5G and later.

Example Wireless Communications Network

FIG. 1 illustrates an example wireless communication network 100, in which aspects of the present disclosure may be practiced. For example, techniques presented herein may be used for power savings for control channel monitoring in enhanced machine type communications (eMTC). Wireless communication network 100 may include base stations (BS) 110 and user equipment (UE) 120. In aspects, a UE 120, which may be a low cost UE such as an eMTC device, can determine, within one or more narrowband regions within a wider system bandwidth, whether a downlink control channel (e.g., an enhanced physical downlink control channel (EPDCCH) or MTC PDDCH (MPDCCH)) is present in a subframe. UE 102 can enter a low power mode (e.g., a micro-sleep) for a duration (e.g., the remainder of the subframe) if the downlink control channel is not present in the subframe.

Wireless communication network 100 may be a long term evolution (LTE) network or some other wireless network, such as a new radio (NR) or 5G network. Wireless communication network 100 may include a number of BSs 110 and other network entities. A BS is an entity that communicates with UEs and may also be referred to as a Node B (NB), enhanced/evolved NB (eNB), a gNB, a 5G NB, a NR NB, a NR BS, an access point (AP), a transmission reception point (TRP), etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, BS 110a may be a macro BS for macro cell 102a, BS 110b may be a pico BS for pico cell 102b, and BS 110c may be a femto BS for femto cell 102c. A BS may support one or multiple (e.g., three) cells. The terms "base station" and "cell" may be used interchangeably herein.

Wireless communication network 100 may also include relay stations. A relay station is an entity that can receive a transmission of data from an upstream station (e.g., BS 110 or UE 120) and send a transmission of the data to a downstream station (e.g., UE 120 or BS 110). A relay station may also be a UE that can relay transmissions for other UEs. In the example shown in FIG. 1, relay station 110d may communicate with macro BS 110a and UE 120d in order to facilitate communication between BS 110a and UE 120d. A relay station may also be referred to as a relay eNB, a relay BS, a relay, etc.

Wireless communication network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless communication network 100. For example, macro BSs may have a high transmit power level (e.g., 5 to 40 Watts) whereas pico BSs, femto BSs, and relay BSs may have lower transmit power levels (e.g., 0.1 to 2 Watts).

Network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., UE 120a, UE 120b, UE 120c) may be dispersed throughout wireless communication network 100, and each UE 120 may be stationary or mobile. A UE may also be referred to as an access terminal, a terminal, a mobile station, a subscriber unit, a station, a Customer Premises Equipment (CPE), etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, medical equipment, a biometric sensor/device, a wearable device such as a smart watch, smart clothing, smart glasses, a smart wristband, and/or smart jewelry (e.g., a smart ring, a smart bracelet, etc.), an entertainment device (e.g., a music device, a video device, a satellite radio, etc.), industrial manufacturing equipment, a global positioning system (GPS) device, or any other suitable device configured to communicate via a wireless or wired medium. Some UEs may be considered machine-type communication (MTC) devices or enhanced/evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

One or more UEs 120 in the wireless communication network 100 (e.g., an LTE network) may also be a narrowband bandwidth UE. As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a BS 110) allocates resources for communication among some or all devices and equipment within its service area or cell. The scheduling entity may be responsible for scheduling, assigning, reconfiguring, and releasing resources for one or more subordinate entities. For scheduled communication, subordinate entities utilize resources allocated by the scheduling entity. BSs 110 are not the only entities that may function as a scheduling entity. In some examples, UE 120 may function as a scheduling entity, scheduling resources for one or more subordinate entities (e.g., one or more other UEs 120). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
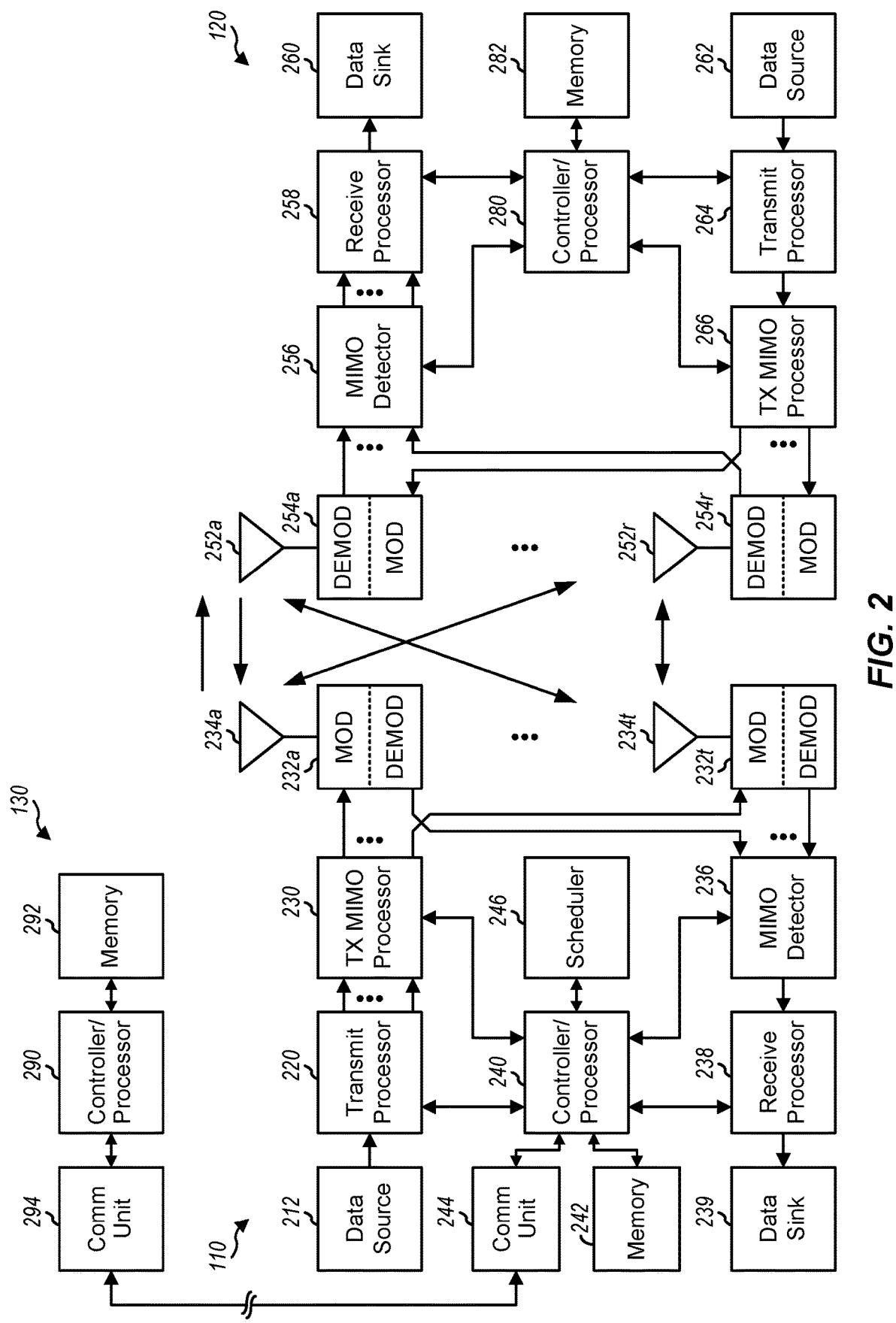
FIG. 2 shows a block diagram conceptually illustrating an example of a base station (BS) in communication with a user equipment (UE) in a wireless communications network, in accordance with certain aspects of the present disclosure.

FIG. 2 shows a block diagram of a design of BS 110 and UE 120, which may be one of the BSs and one of the UEs shown in wireless communication system 100 illustrated in FIG. 1. BS 110 may be equipped with T antennas 234a through 234t, and UE 120 may be equipped with R antennas 252a through 252r, where in general T≥1 and R≥1.

At BS 110, transmit processor 220 may receive data from data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for static resource partitioning (SRPI), etc.) and control information (e.g., CQI requests, grants, upper layer signaling, etc.) and provide overhead symbols and control symbols. Processor 220 may also generate reference symbols for reference signals (e.g., the cell-specific reference signal (CRS)) and synchronization signals (e.g., the primary synchronization signal (PSS) and secondary synchronization signal (SSS)). Transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. MIMO detector 256 may obtain received symbols from all R demodulators 254a through 254r, perform MIMO detection on the received symbols if applicable, and provide detected symbols. Receive processor 258 may process (e.g., demodulate and decode) the detected symbols, provide decoded data for UE 120 to data sink 260, and provide decoded control information and system information to controller/processor 280. A channel processor may determine reference signal received power (RSRP), receive signal strength indicator (RSSI), reference signal receive quality (RSRQ), CQI, etc.

On the uplink, at UE 120, transmit processor 264 may receive and process data from data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by TX MIMO processor 266 if applicable, further processed by modulators 254a through 254r (e.g., for SC-FDM, OFDM, etc.), and transmitted to BS 110. At BS 110, the uplink signals from UE 120 and other UEs may be received by antennas 234, processed by demodulators 232, detected by MIMO detector 236 if applicable, and further processed by receive processor 238 to obtain decoded data and control information sent by UE 120. Processor 238 may provide the decoded data to data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively, to perform techniques presented herein for power savings for control channel monitoring in eMTC. For example, processor 240 and/or other processors and modules at BS 110, and processor 280 and/or other processors and modules at UE 120, may perform or direct operations of BS 110 and UE 120, respectively. For example, controller/processor 280 and/or other controllers/processors and modules at UE 120, and/or controller/processor 240 and/or other controllers/processors and modules at BS 110 may perform or direct operations 1300 and 1400 shown in FIGS. 13 and 14, respectively. Memories 242 and 282 may store data and program codes for BS 110 and UE 120, respectively. A scheduler 246 may schedule UEs for data transmission on the downlink and/or uplink.

Figure 3:
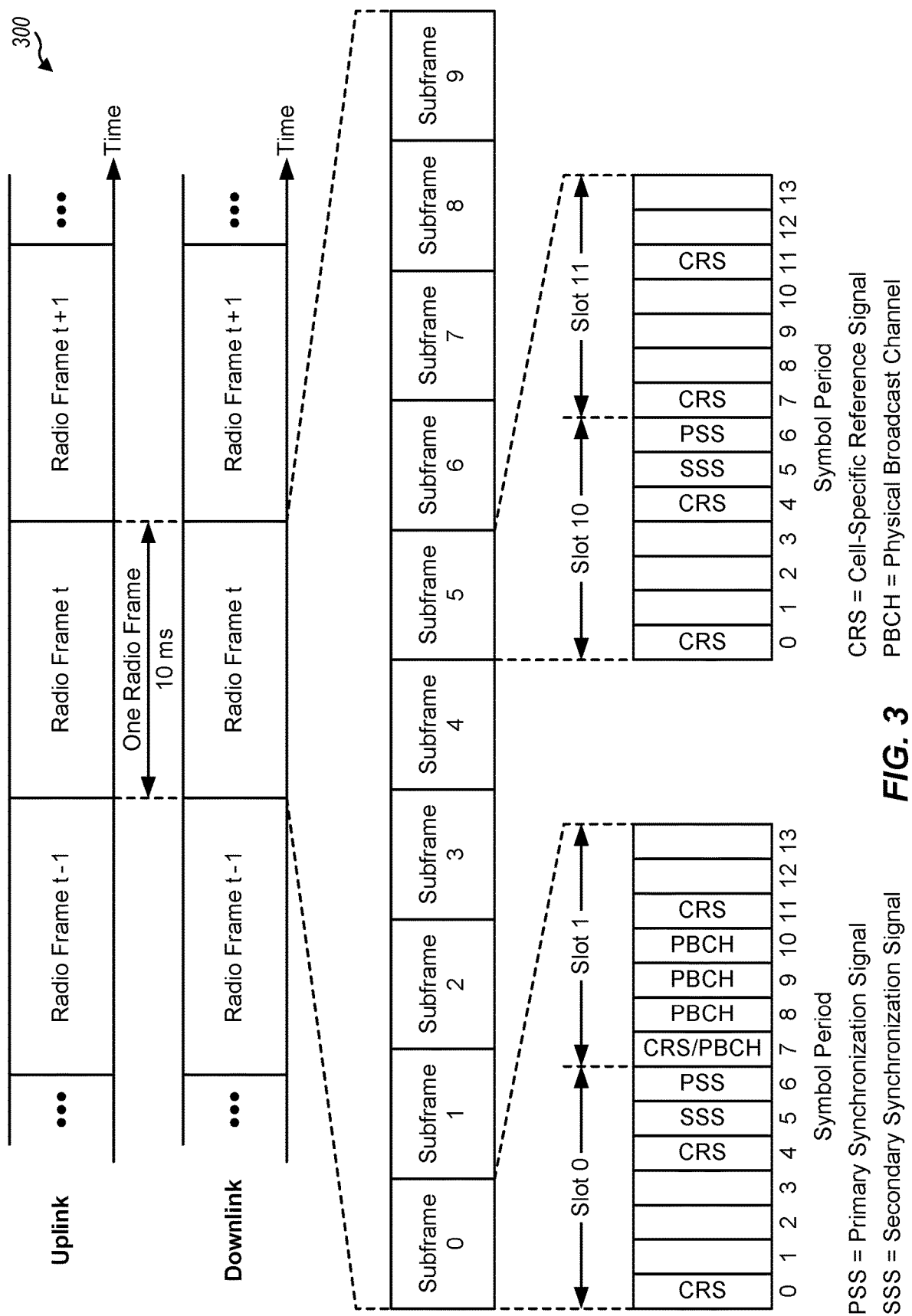
FIG. 3 is a block diagram conceptually illustrating an example of a frame structure in a wireless communications network, in accordance with certain aspects of the present disclosure.

FIG. 3 shows an exemplary frame structure 300 for frequency division duplexing (FDD) in a wireless communication systems (e.g., such as wireless communication network 100). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, for example, seven symbol periods for a normal cyclic prefix (as shown in FIG. 3) or six symbol periods for an extended cyclic prefix. The 2L symbol periods in each subframe may be assigned indices of 0 through 2L−1.

In certain wireless communication systems (e.g., LTE), a BS may transmit a PSS and a SSS on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a CRS across the system bandwidth for each cell supported by the BS. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In certain systems (e.g., such as NR or 5G systems), a BS may transmit these or other signals in these locations or in different locations of the subframe.

Figure 4:
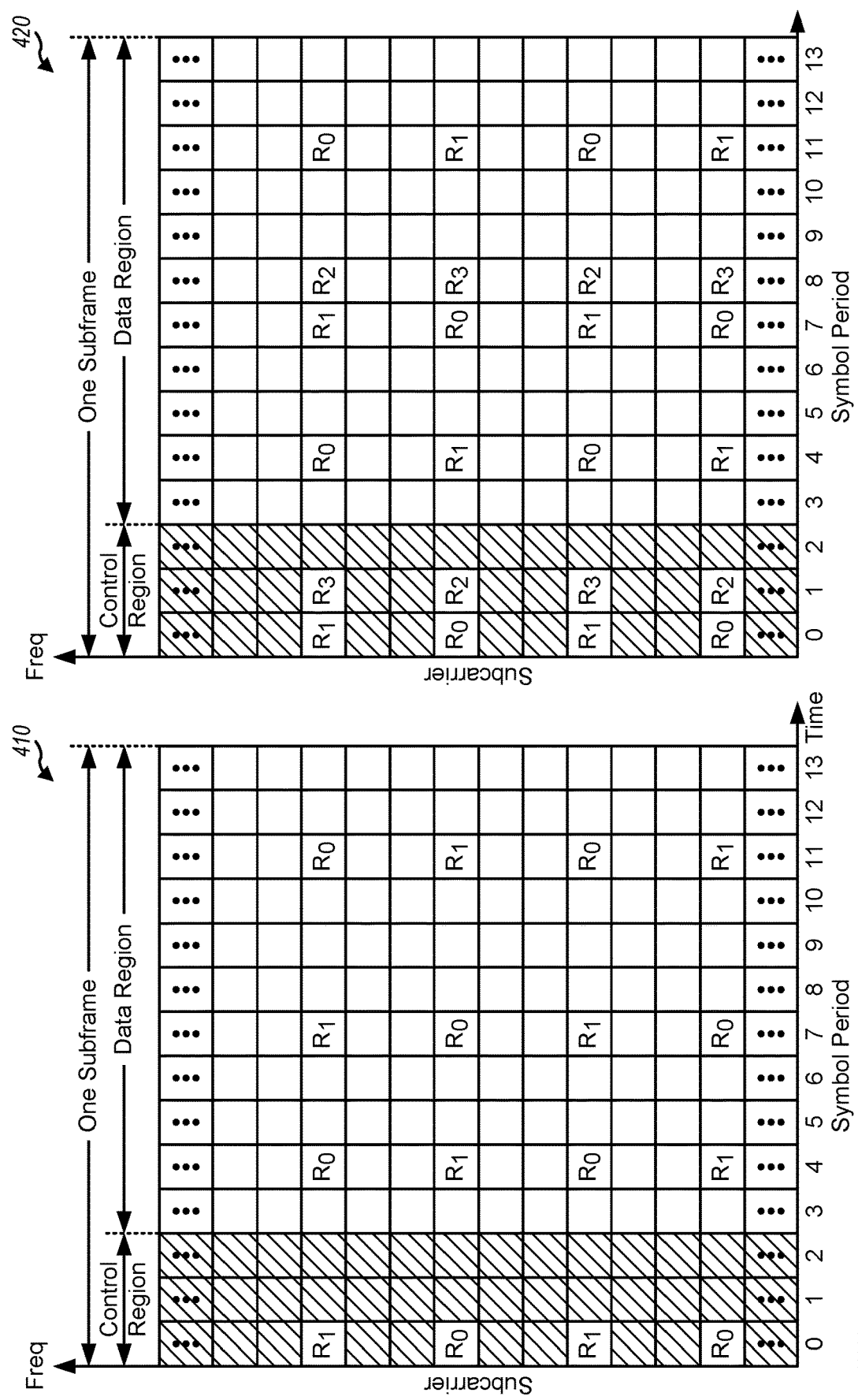
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks (RBs). Each RB may cover 12 subcarriers in one slot and may include a number of resource elements (REs). Each RE may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given RE with label Ra, a modulation symbol may be transmitted on that RE from antenna A, and no modulation symbols may be transmitted on that RE from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats

410 and 420, REs not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD (e.g., in LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, ..., Q−1}.

The wireless network (e.g., wireless communication network 100) may support hybrid automatic retransmission request (HARQ) for data transmission on the downlink and uplink. For HARQ, a transmitter (e.g., a BS 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a RSRQ, or some other metric. The UE may operate in a dominant interference scenario in which the UE may observe high interference from one or more interfering BS.

Example Narrowband Communications

The wireless communication network may support a 180 kHz deployment for narrowband operation, such as narrowband Internet-of-Things (NB-IoT) and/or narrowband enhanced/evolved machine type communication(s) (eMTC) with different deployment modes. In one example, narrowband operations may be deployed in-band, for example, using resource blocks (RBs) within a wider system bandwidth. In one case, narrowband operations may use one RB within the wider system bandwidth of an existing network, for example, such as a long term evolution (LTE) network. In this case, the 180 kHz bandwidth for the RB may have to be aligned with a wideband RB. In one example, narrowband operations may be deployed in the unused RBs within a carrier guard-band (e.g., LTE). In this deployment, the 180 kHz RB within the guard band may be aligned with a 15 kHz tone grid of wideband LTE, for example, in order to use the same Fast Fourier Transform (FFT) and/or reduce interference in-band legacy LTE communications.

The focus of traditional LTE design (e.g., for legacy "non MTC" and/or "non-IoT" devices) is on the improvement of spectral efficiency, ubiquitous coverage, and enhanced quality of service (QoS) support. Current LTE system downlink and uplink link budgets are designed for coverage of high end devices, such as state-of-the-art smartphones and tablets, which may support a relatively large downlink and uplink link budget.

However, as described above, one or more UEs in the wireless communication network (e.g., wireless communication network 100) may be low cost devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (relative to wideband UEs), a single receive radio frequency (RF) chain may be used, peak rate may be reduced (e.g., a maximum of 100 bits or a 1000 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 us for regular UEs to 1 ms for MTC UEs. Release 12 MTC UEs may still monitor downlink control channels in the same way as regular UEs, for example, by monitoring for wideband control channels in the first few symbols (e.g., physical downlink control channel (PDCCH)) as well as narrowband control channels occupying a relatively narrowband, but spanning a length of a subframe (e.g., enhanced PDCCH (EPDCCH)).

Certain standards (e.g., LTE Release 13) may introduce support for various additional MTC enhancements, referred to herein as evolved/enhanced MTC (eMTC). For example, eMTC may provide MTC UEs with coverage enhancements up to 15 dB.

Figure 5:
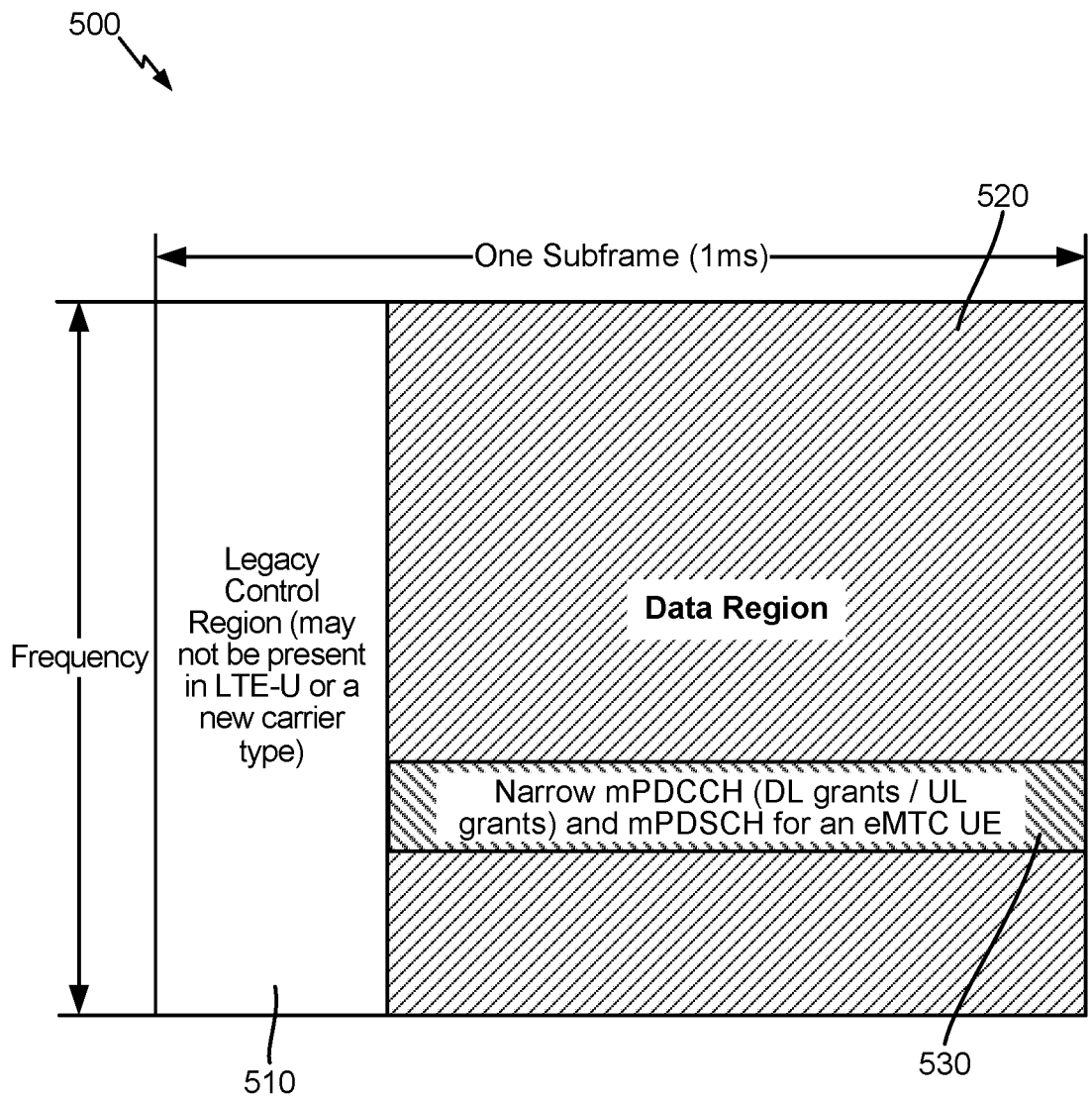
FIG. 5 illustrates an exemplary subframe configuration for narrowband communications, in accordance with certain aspects of the present disclosure.

As illustrated in the subframe structure 500 of FIG. 5, eMTC UEs can support narrowband operation while operating in a wider system bandwidth (e.g., a 1.4 MHz, 3 MHz, 5 MHz, 10 MHz, 15 MHz, and/or a 20 MHz system bandwidth). In the example illustrated in FIG. 5, a conventional legacy control region 510 may span system bandwidth of a first few symbols, while a narrowband region 530 of the system bandwidth (spanning a narrow portion of a data region 520) may be reserved for an MTC PDCCH (MPDCCH) and for an MTC physical downlink shared channel (MPDSCH). In some cases, an (e)MTC UE monitoring the narrowband region may operate at 1.4 MHz or 6 RBs. The MPDCCH may rely on demodulation reference signal (DMRS) demodulation. Coverage may be increased by performing repetition/bundling of signals.

However, as noted above, eMTC UEs may be able to operate in a cell with a bandwidth larger than 6 RBs. Within this larger bandwidth, each eMTC UE may still operate (e.g., monitor/receive/transmit) while abiding by a 6-PRB constraint. In some cases, different eMTC UEs may be served by different narrowband regions (e.g., with each spanning 6-PRB blocks). As the system bandwidth may span from 1.4 MHz to 20 MHz, or from 6 RBs to 100 RBs, multiple narrowband regions may exist within the larger bandwidth. An eMTC UE may switch or hop between multiple narrowband regions in order to reduce interference.

IoT may refer to a network of physical objects, devices, or "things". IoT devices may be embedded with, for example, electronics, software, or sensors and may have network connectivity, which enable these devices to collect and exchange data. IoT devices may be sensed and controlled remotely across existing network infrastructure, creating opportunities for more direct integration between the physical world and computer-based systems and resulting in improved efficiency, accuracy, and economic benefit. Systems that include IoT devices augmented with sensors and actuators may be referred to cyber-physical systems. Cyber-physical systems may include technologies such as smart grids, smart homes, intelligent transportation, and/or smart cities. Each "thing" (e.g., IoT device) may be uniquely identifiable through its embedded computing systems and may be able to interoperate within existing infrastructure, such as Internet infrastructure.

Certain wireless communication systems (e.g., wireless communication network 100), such as Release 13 eMTC systems), may support narrowband IoT (NB-IoT) operation. NB-IoT may refer to a narrowband radio technology designed for IoT. NB-IoT may focus on indoor coverage, low cost, long batter life, and large number of devices. To reduce the complexity of UEs, NB-IoT may allow for narrowband deployments utilizing one PRB (e.g., 180 kHz+ 20 kHz guard band).

NB-IoT may offer standalone, in-band, or guard band deployment scenarios. Standalone deployment may use new bandwidth, whereas guard band deployment may be done using bandwidth typically reserved in the guard band of an existing network, such as long term evolution (LTE). In-band deployment on the other hand may use the same resource blocks in the LTE carrier of the existing LTE network. NB-IoT may offer increased coverage. NB-IoT may define a new narrowband control channel (e.g., NPDCCH), data (e.g., PDSCH), and references signals (e.g., NRS) that fit in 1 RB.

Figure 6:
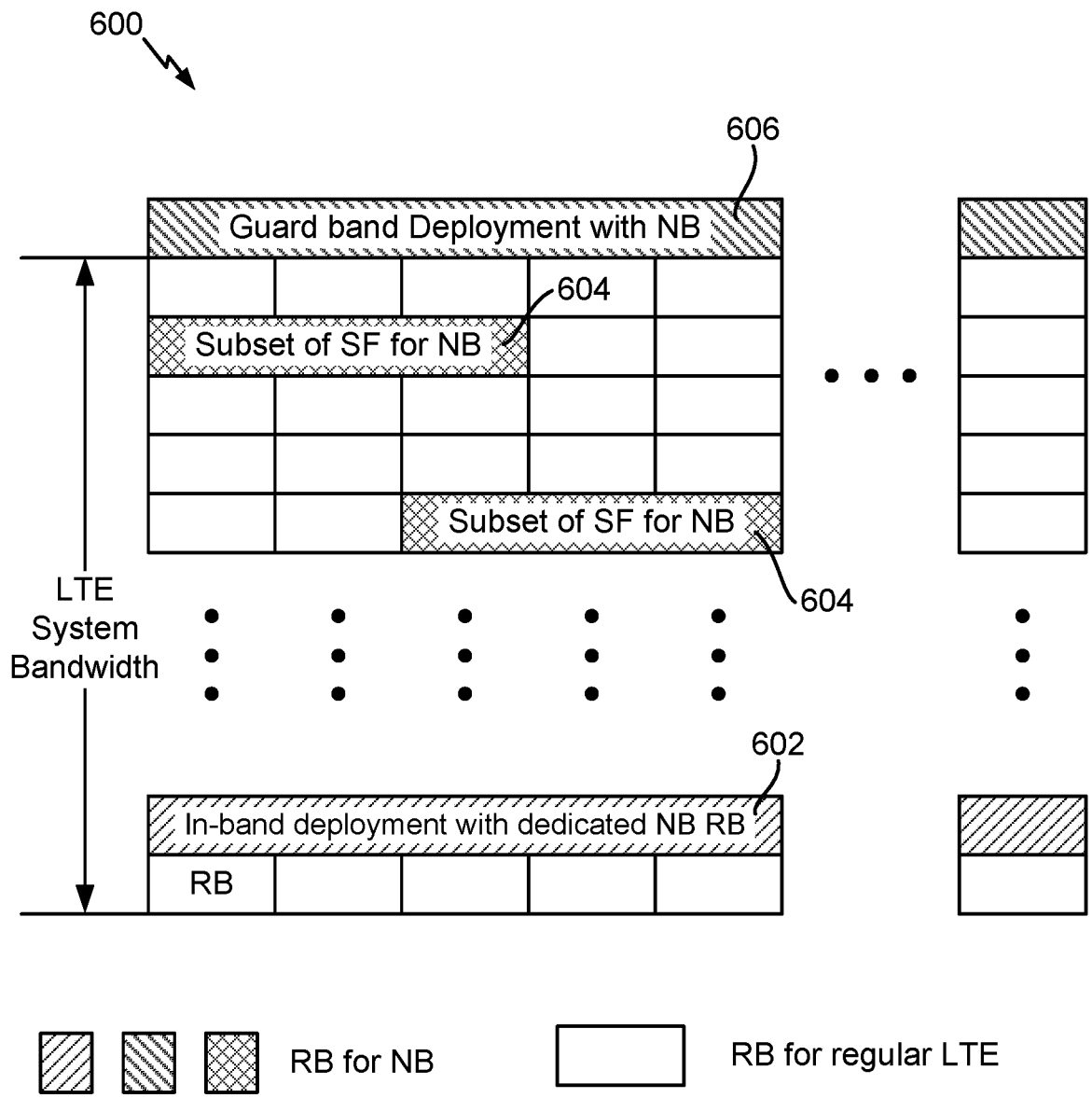
FIG. 6 illustrates an example deployment of narrowband communications, in accordance with certain aspects of the present disclosure.

FIG. 6 illustrates an example deployment 600 of NB-IoT, according to certain aspects of the present disclosure. Three NB-IoT deployment configurations include in-band, guard-band, and standalone. For the in-band deployment configuration, NB-IoT may coexist with a legacy system (e.g., GSM, WCDMA, and/or LTE system(s)) deployed in the same frequency band. For example, the wideband LTE channel may be deployed in various bandwidths between 1.4 MHz to 20 MHz. As shown in FIG. 6, a dedicated RB 602 within that bandwidth may be available for use by NB-IoT and/or the RBs 1204 may be dynamically allocated for NB-IoT. As shown in FIG. 6, in an in-band deployment, one RB, or 200 kHz, of a wideband channel (e.g., LTE) may be used for NB-IoT.

Certain systems (e.g., LTE) may include unused portions of the radio spectrum between carriers to guard against interference between adjacent carriers. In some deployments, NB-IoT may be deployed in a guard band 606 of the wideband channel.

In other deployments, NB-IoT may be deployed standalone (not shown). In a standalone deployment, one 200 MHz carrier may be utilized to carry NB-IoT traffic and GSM spectrum may be reused.

Deployments of NB-IoT may include synchronization signals such as PSS for frequency and timing synchronization and SSS to convey system information. For NB-IoT operations, PSS/SSS timing boundaries may be extended as compared to the existing PSS/SSS frame boundaries in legacy systems (e.g., LTE), for example, from 10 ms to 40 ms. Based on the timing boundary, a UE is able to receive a PBCH transmission, which may be transmitted in subframe 0 of a radio frame.

Example NR/5G RAN Architecture

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier (CC) bandwidth of 100 MHZ may be supported. NR RBs may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units (CUs) or distributed units (DUs).

The NR RAN may include a CU and DUs. A NR BS (e.g., a NB, an eNB, a gNB, a 5G NB, a TRP, an AP, etc.) may correspond to one or multiple BSs. NR cells can be configured as access cells (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals—in some case cases DCells may transmit synchronization signals.

Figure 7:
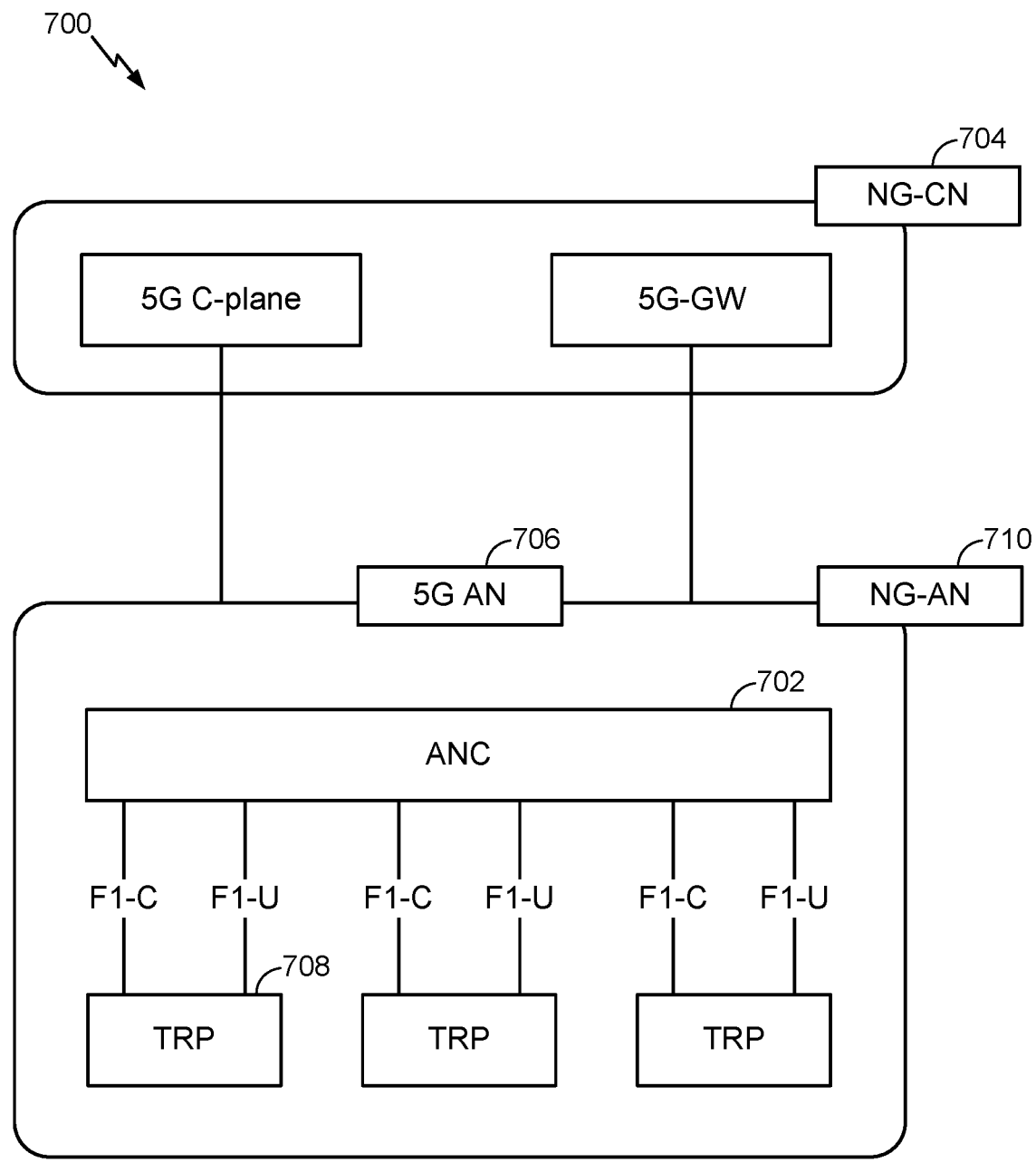
FIG. 7 illustrates an example logical architecture of a distributed radio access network (RAN), in accordance with certain aspects of the present disclosure.

FIG. 7 illustrates an example logical architecture 700 of a distributed RAN, according to aspects of the present disclosure. 5G access node 706 may include access node controller (ANC) 702. ANC 702 may be a CU of the distributed RAN. The backhaul interface to the next generation core network (NG-CN) 704 may terminate at ANC 702. The backhaul interface to neighboring next generation access nodes (NG-ANs) 710 may terminate at ANC 702. ANC 702 may include one or more TRPs 708. As described above, TRP may be used interchangeably with "cell", BS, NR BS, NB, eNB, 5G NB, gNB, AP, etc.

TRPs 708 may comprise a DU. TRPs 708 may be connected to one ANC (e.g., ANC 702) or more than one ANC (not illustrated). For example, for RAN sharing, radio as a service (RaaS), and service specific AND deployments, TRP 708 may be connected to more than one ANC. TRP 708 may include one or more antenna ports. TRPs 708 may be configured to individually (e.g., dynamic selection) or jointly (e.g., joint transmission) serve traffic to a UE.

Logical architecture 700 may be used to illustrate fronthaul definition. The architecture may be defined that support fronthauling solutions across different deployment types. For example, logical architecture 700 may be based on transmit network capabilities (e.g., bandwidth, latency, and/or jitter). Logical architecture 700 may share features and/or components with LTE. According to aspects, NG-AN 710 may support dual connectivity with NR. NG-AN 710 may share a common fronthaul for LTE and NR. Logical architecture 700 may enable cooperation between and among TRPs 708. For example, cooperation may be preset within a TRP and/or across TRPs via ANC 702. In some cases, no inter-TRP interface may be needed/present.

A dynamic configuration of split logical functions may be present within logical architecture 700. The packet data convergence protocol (PDCP), radio link control (RLC), and medium access control (MAC) protocols may be adaptably placed at ANC 702 or TRP 708.

Figure 8:
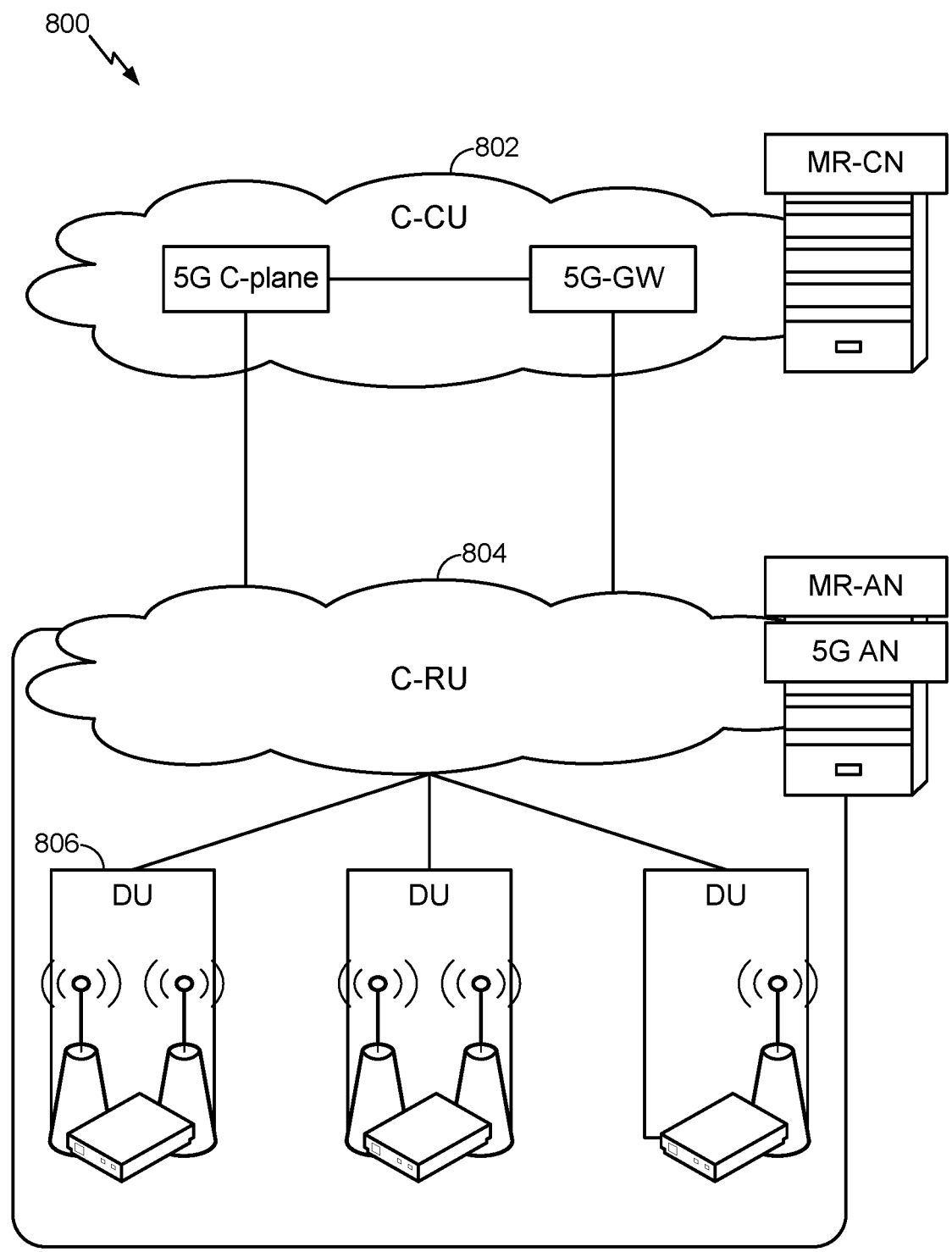
FIG. 8 illustrates an example physical architecture of a distributed RAN, in accordance with certain aspects of the present disclosure.

FIG. 8 illustrates an example physical architecture 800 of a distributed RAN, according to aspects of the present disclosure. Centralized core network unit (C-CU) 802 may host core network functions. C-CU 802 may be centrally deployed. C-CU 802 functionality may be offloaded (e.g., to advanced wireless services (AWS)), in an effort to handle peak capacity.

Centralized RAN unit (C-RU) 804 may host one or more ANC functions. Optionally, C-RU 804 may host core network functions locally. C-RU 804 may have distributed deployment. C-RU 804 may be closer to the network edge.

DU 806 may host one or more TRPs. DU 806 may be located at edges of the network with radio frequency (RF) functionality.

Figure 9:
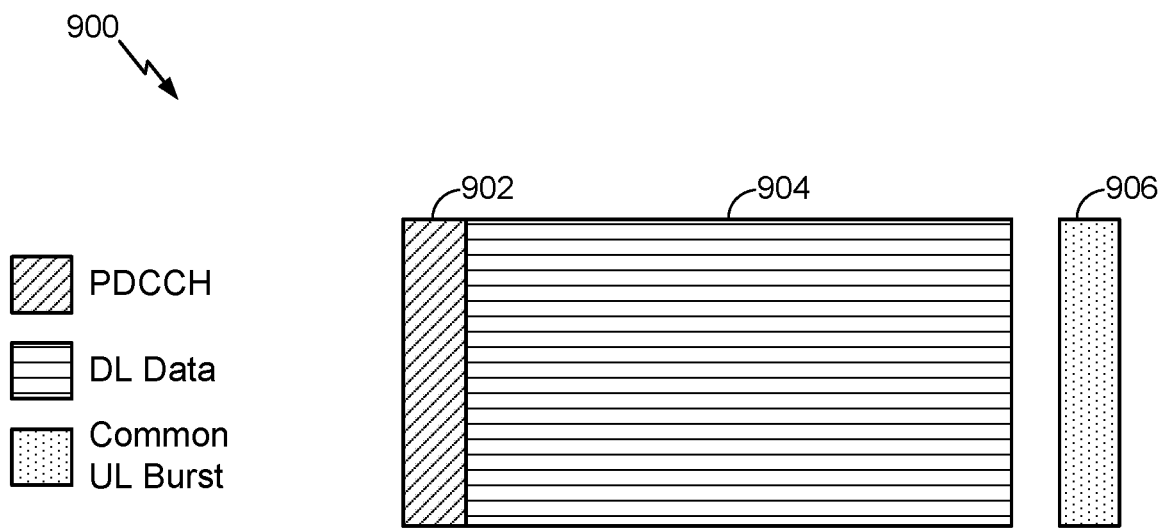
FIG. 9 is a diagram illustrating an example of a downlink (DL)-centric subframe, in accordance with certain aspects of the present disclosure.

FIG. 9 is a diagram showing an example of a DL-centric subframe 900. DL-centric subframe 900 may include control portion 902. Control portion 902 may exist in the initial or beginning portion of DL-centric subframe 900. Control portion 902 may include various scheduling information and/or control information corresponding to various portions of DL-centric subframe 900. In some configurations, control portion 902 may be a physical DL control channel (PDCCH), as shown in FIG. 9. DL-centric subframe 900 may also include DL data portion 904. DL data portion 904 may sometimes be referred to as the payload of DL-centric subframe 900. DL data portion 904 may include the communication resources utilized to communicate DL data from the scheduling entity (e.g., UE or BS) to the subordinate entity (e.g., UE). In some configurations, DL data portion 904 may be a physical DL shared channel (PDSCH).

DL-centric subframe 900 may also include common UL portion 906. Common UL portion 906 may sometimes be referred to as an UL burst, a common UL burst, and/or various other suitable terms. Common UL portion 906 may include feedback information corresponding to various other portions of DL-centric subframe 900. For example, common UL portion 906 may include feedback information corresponding to control portion 902. Non-limiting examples of feedback information may include an acknowledgment (ACK) signal, a negative acknowledgment (NACK) signal, a HARQ indicator, and/or various other suitable types of information. Common UL portion 906 may include additional or alternative information, such as information pertaining to random access channel (RACH) procedures, scheduling requests (SRs), and various other suitable types of information. As illustrated in FIG. 9, the end of DL data portion 904 may be separated in time from the beginning of common UL portion 906. This time separation may sometimes be referred to as a gap, a guard period, a guard interval, and/or various other suitable terms. This separation provides time for the switch-over from DL communication (e.g., reception operation by the subordinate entity) to UL communication (e.g., transmission by the subordinate entity). One of ordinary skill in the art will understand that the foregoing is merely one example of a DL-centric subframe and alternative structures having similar features may exist without necessarily deviating from the aspects described herein.

Figure 10:
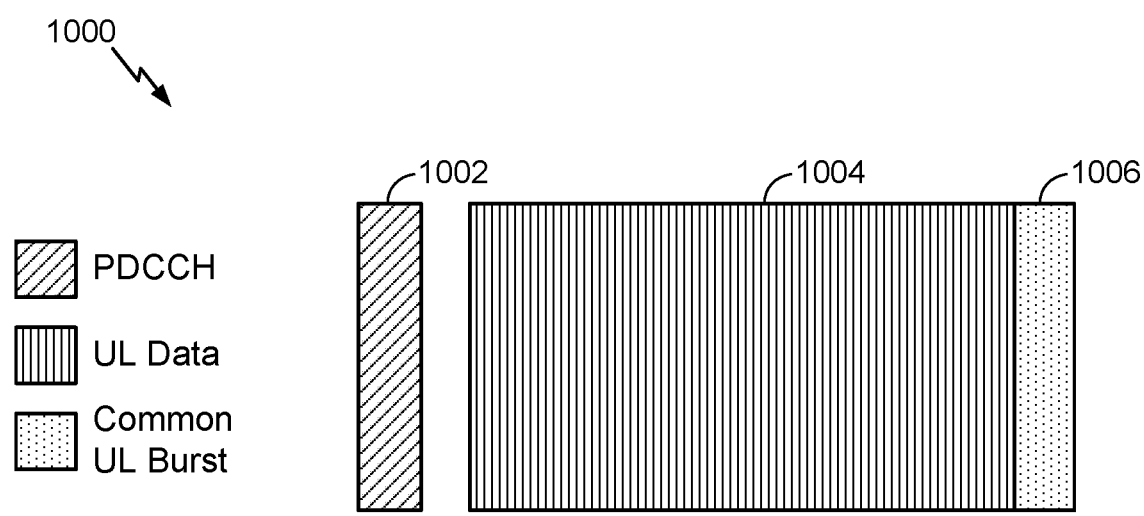
FIG. 10 is a diagram illustrating an example of an uplink (UL)-centric subframe, in accordance with certain aspects of the present disclosure.

FIG. 10 is a diagram showing an example of UL-centric subframe 1000. UL-centric subframe 1000 may include control portion 1002. Control portion 1002 may exist in the initial or beginning portion of UL-centric subframe 1000. Control portion 1002 in FIG. 10 may be similar to control portion 1002 described above with reference to FIG. 9. UL-centric subframe 1000 may also include UL data portion 1004. UL data portion 1004 may sometimes be referred to as the payload of UL-centric subframe 1000. The UL portion may refer to the communication resources utilized to communicate UL data from the subordinate entity (e.g., UE) to the scheduling entity (e.g., UE or BS). In some configurations, control portion 1002 may be a PDCCH. In some configurations, the data portion may be a physical uplink shared channel (PUSCH).

As illustrated in FIG. 10, the end of control portion 1002 may be separated in time from the beginning of UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). UL-centric subframe 1000 may also include common UL portion 1006. Common UL portion 1006 in FIG. 10 may be similar to common UL portion 906 described above with reference to FIG. 9. Common UL portion 1006 may additionally or alternatively include information pertaining to CQI, sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a RRC dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Power Saving for Downlink Channel Monitoring in Narrowband Systems

As mentioned above, certain systems (e.g., such as wireless communication system 100, which may be a Release 13 or beyond enhanced machine type communications (eMTC) system), may support narrowband operation (e.g., communications on a six resource block (RB) band) and half-duplex transmissions/reception for up to 15 dB coverage enhancements. These systems may reserve a portion of the system bandwidth for an MTC physical downlink control channel (MPDCCH). The MPDCCH may be transmitted in a narrowband, may use (e.g., span) at least one subframe, and may rely on demodulation reference signal (DMRS) demodulation.

In certain systems, such as "legacy" long term evolution (LTE) systems (e.g., Release-12 or earlier LTE systems), downlink data in a physical downlink shared channel (PDSCH) is scheduled in a same subframe as the scheduling information and uplink data in a physical uplink shared channel (PUSCH) is scheduled for four subframes after the scheduling information (i.e., N+4, where the scheduling is received in subframe N). In other systems, such as eMTC systems, scheduling may be cross-subframe for both uplink and downlink. For example, downlink data in a PDSCH may be scheduled for two subframes after the scheduling information (i.e., N+2) and uplink data in a PUSCH may be scheduled for four subframes after the scheduling information (i.e., N+4).

In eMTC, the control channel for the scheduling information (e.g., the MPDCCH), may be bundled (e.g., repeated multiple times/transmitted in multiple subframes). In some cases, the user equipment (UE) (e.g., a UE 120) may not need all of the subframes/repetitions in the bundle to successfully decode the MPDCCH and the UE may early decode the scheduling information. For example, the BS (e.g., a BS 110) may send MPDCCH with ten (10) repetitions, but the UE may decode the MPDCCH after only five (5) repetitions.

Figure 11:
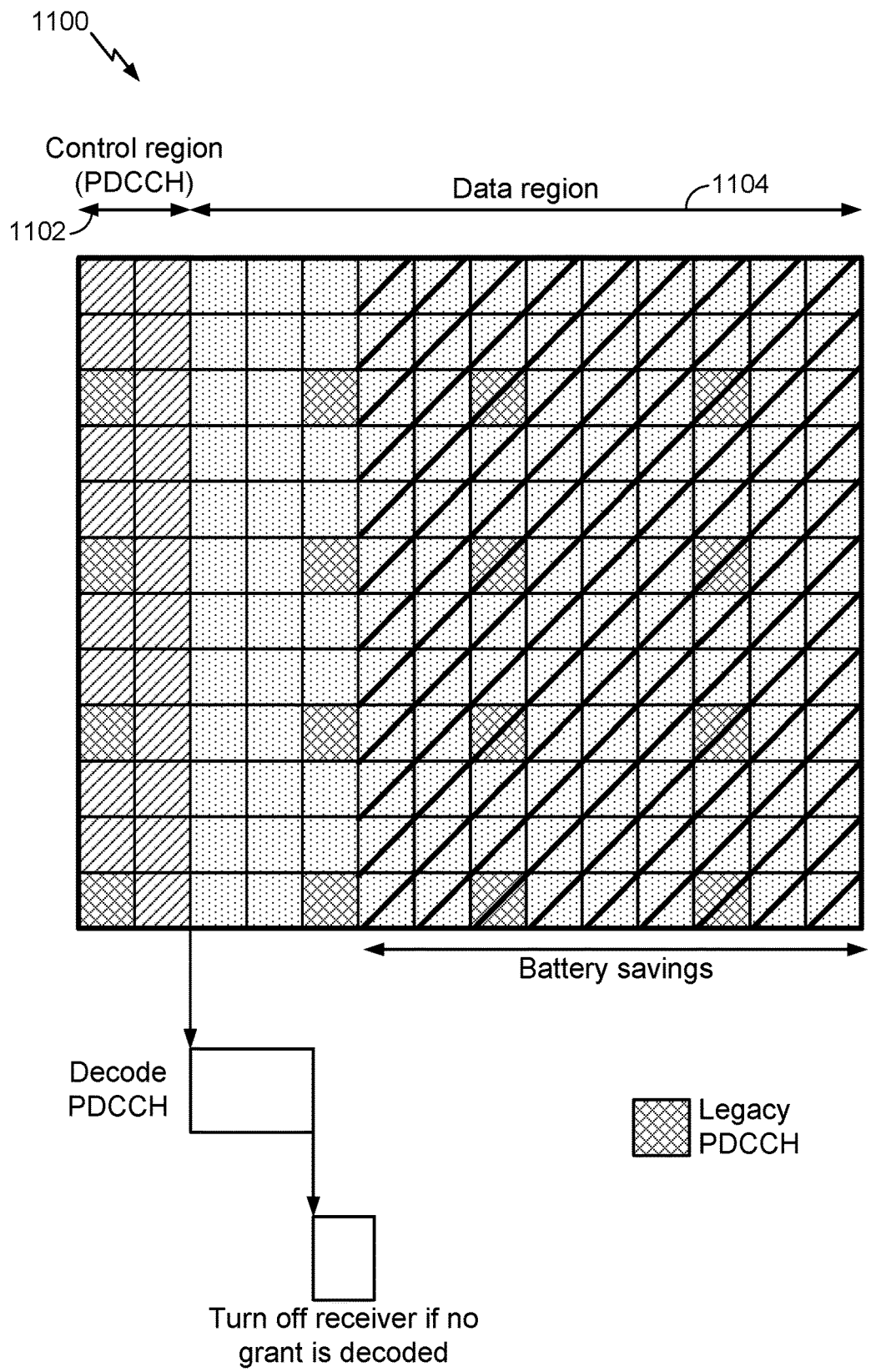
FIG. 11 is a block diagram conceptually illustrating power savings after physical downlink control channel (PDCCH) decoding in an exemplary subframe format, in accordance with certain aspects of the present disclosure.

In certain systems (e.g., legacy LTE systems), the UE may skip receiving the last (e.g., remaining) part of the subframe once the downlink grant is received (e.g., decoded). As shown in the example illustrated in FIG. 11, control region 1102 (which may carry the control channel, such as PDCCH) may occupy the first two symbols of subframe 1100 and data region 1104 may occupy the remaining symbols of the subframe 1100. The UE may begin PDCCH decoding after the second symbol. The decoding may include performing demodulation and channel estimation. The decoding may use two symbols (i.e., the third and fourth symbols). If the UE determines, based on the decoding, that no grant is received (e.g., no data scheduled), the UE enter a low power mode (e.g., micro-sleep) for a duration (e.g., a very short sleep period, which may be less than one subframe). As shown in FIG. 11, the UE can power down the receiver (e.g., in the fifth symbol) and sleep for the remainder of the subframe (e.g., the sixth symbol through the fourteenth symbol), since the UE is not expecting (e.g., scheduled to receive) any data in that subframe. This may provide power savings (e.g., battery savings) for the UE.

Figure 12:
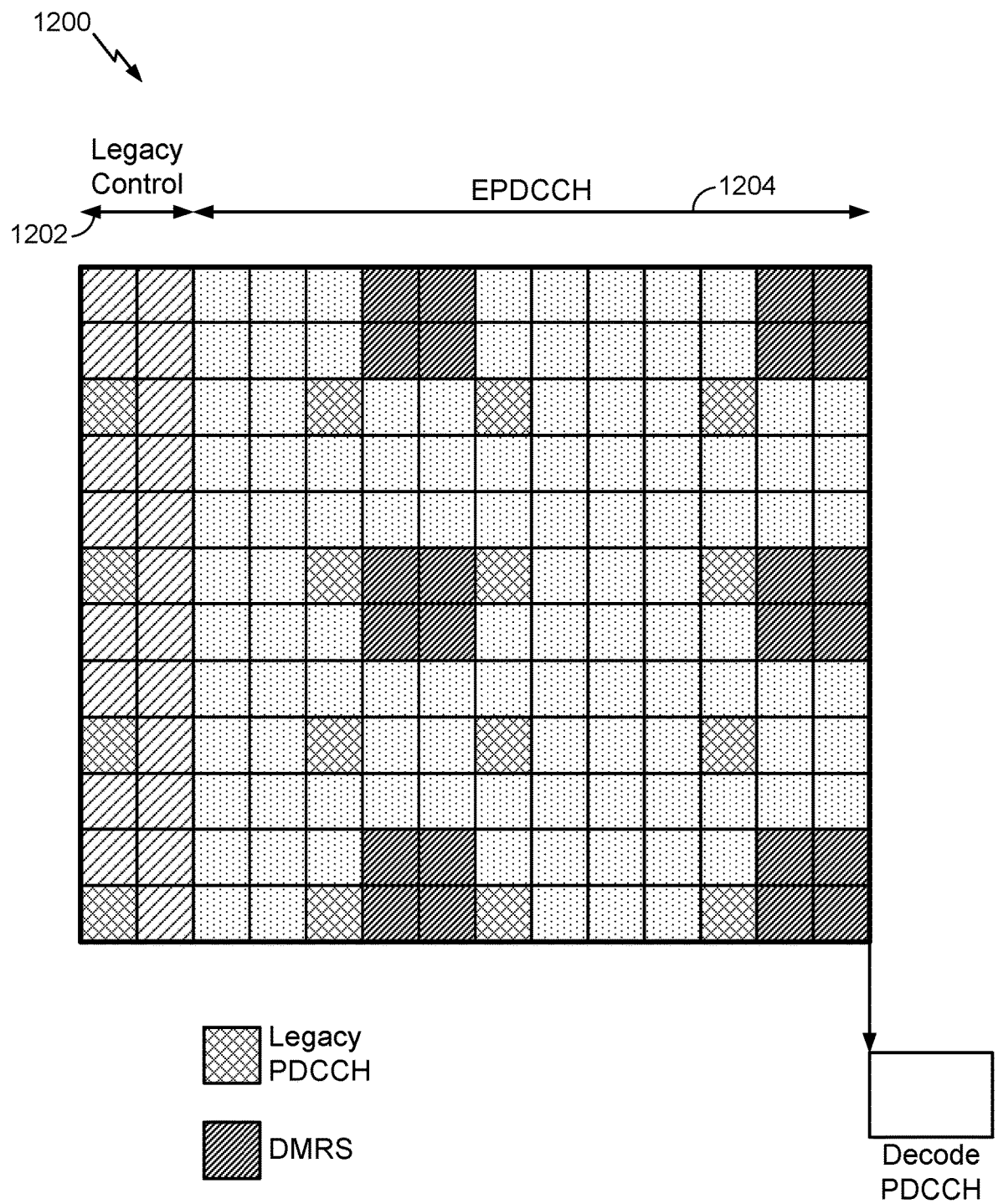
FIG. 12 is a block diagram conceptually illustrating power savings after enhanced PDCCH (EPDDCH) decoding in an exemplary subframe format, in accordance with certain aspects of the present disclosure.

As illustrated in FIG. 12, in certain systems (e.g., certain eMTC systems), the downlink control channel (e.g., EPDCCH or MPDCCH which uses a similar design) may be transmitted in the region 1204 across the entire subframe 1200. Thus, the UE may wait until the end of subframe 1200 before decoding the downlink control channel to determine whether there is a grant. In this case, the UE does not have an opportunity to determine that there is no data and enter the low power mode and power savings due to micro-sleep are, therefore, less likely for these systems than for the legacy LTE techniques shown in FIG. 11, for example.

Accordingly, techniques for power savings for downlink channel monitoring in narrowband systems, such as eMTC, are desirable. Aspects herein provide for new signaling/channel from the BS to the UE to indicate whether a downlink channel is present in the subframe. Thus, the UE may not have to finish decoding before entering the low power mode. In other aspects, the UE can determine whether the downlink channel is present based on energy detection and/or DMRS detection in the subframe. Thus, the UE may be able to achieve power savings, even in systems in which the downlink channel spans the subframe, for example.

Figure 13:
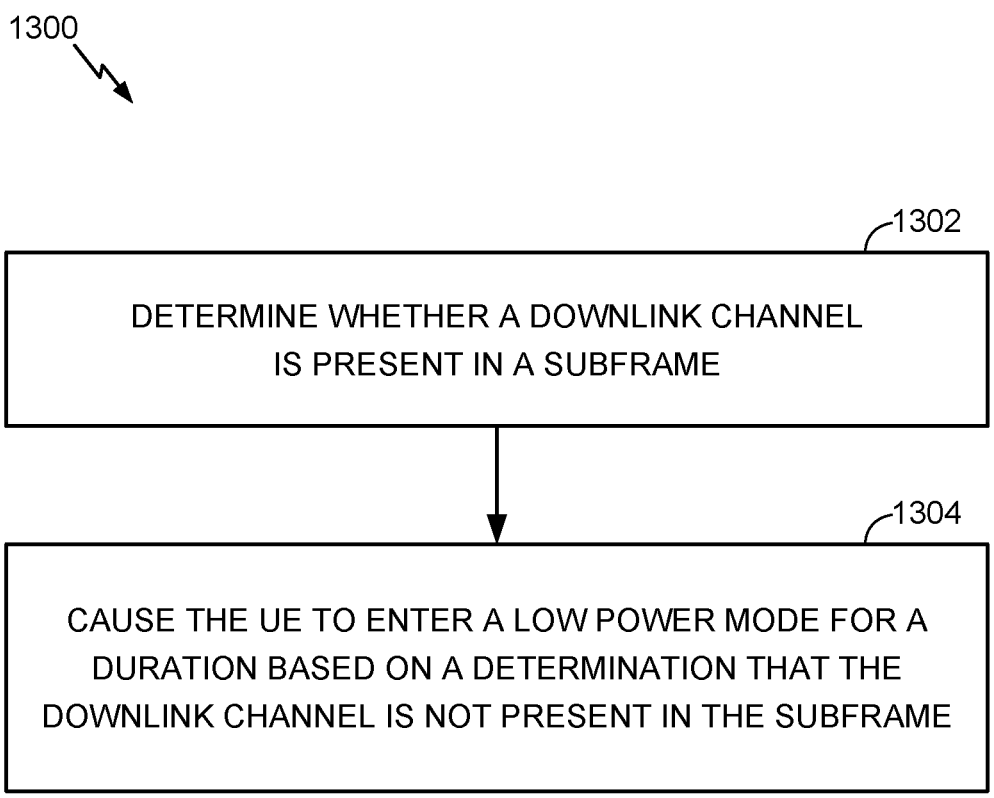
FIG. 13 is a flow diagram illustrating example operations for wireless communications by a UE, in accordance with certain aspects of the present disclosure.

FIG. 13 is a flow diagram illustrating example operations 1300 for wireless communications, in accordance with certain aspects of the present disclosure. Operations 1300 may be performed, for example, by a UE (e.g., UE 120) which may be a low cost device such as an eMTC UE. Operations 1300 may begin, at 1302, by determining (e.g., within one or more narrowband regions within a wider system bandwidth) whether a downlink channel (e.g., EPDCCH or MPDCCH) is present in a subframe. At 1304, the UE enters a low power mode (e.g., a micro-sleep mode) for a duration (e.g., the remainder of the subframe) based on a determination that the downlink channel is not present in the subframe. As will be described in more detail herein, the determination can be based on DMRS detection in a set of symbols in the subframe, energy detection on decoding candidate tones in the subframe, and/or reception of new signaling/channel indicating whether there is a grant in the subframe.

Figure 14:
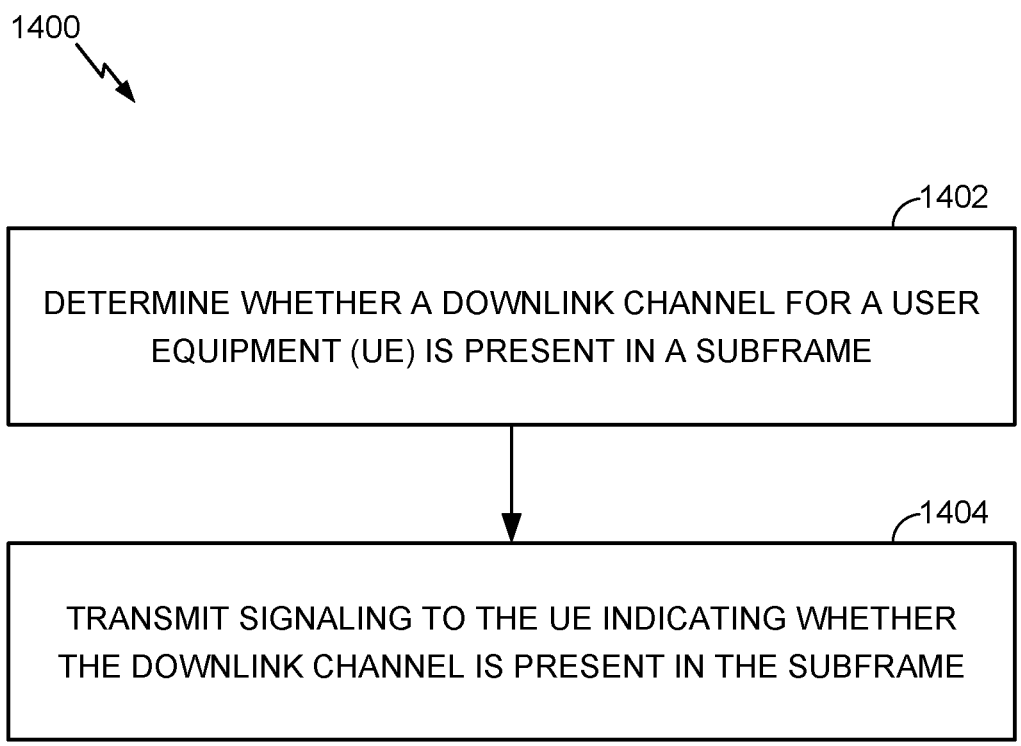
FIG. 14 is a flow diagram illustrating example operations for wireless communications by a BS, in accordance with certain aspects of the present disclosure.

FIG. 14 is a flow diagram illustrating example operations 1400 for wireless communications, in accordance with certain aspects of the present disclosure. Operations 1400 may be performed, for example, by a BS (e.g., BS 110). Operations 1400 may be complementary operations by the BS to operations 1300 performed by the UE. Operations 1400 may begin, at 1402, by determining (e.g., within one or more narrowband regions within a wider system bandwidth), whether a downlink channel (e.g., a downlink control channel) for a UE is present in a subframe. At 1404, the BS transmits signaling to the UE indicating whether the downlink channel is present in the subframe.

Example DMRS Detection

In certain systems (e.g., Release-13 systems or beyond), DMRS sequence initialization can be configured in a UE-specific manner. The EPDCCH ID that is used for initialization can be provided by radio resource configuration (RRC) signaling.

According to certain aspects, the UE may perform blind detection to determine whether DMRS is present in a subframe. If DMRS is detected not to be present in the subframe, then the UE may determine that there is no grant in the subframe and, therefore, may stop monitoring and enter the low power mode (e.g., micro-sleep).

The number of DMRS that the UE monitors before detecting (e.g., determining/deciding) that DMRS is not present may depend on the repetition level of the control channel (e.g., EPDCCH or MPDCCH), the signal-to-noise ratio (SNR), whether the resources are localized or distributed, etc. For example, if the repetition level is 4, the UE may monitor up to three DMRS to correctly detect MPDCCH. As another example, if SNR is very low, detection may not be reliable and the UE may always perform MPDCCH decoding.

Figure 15:
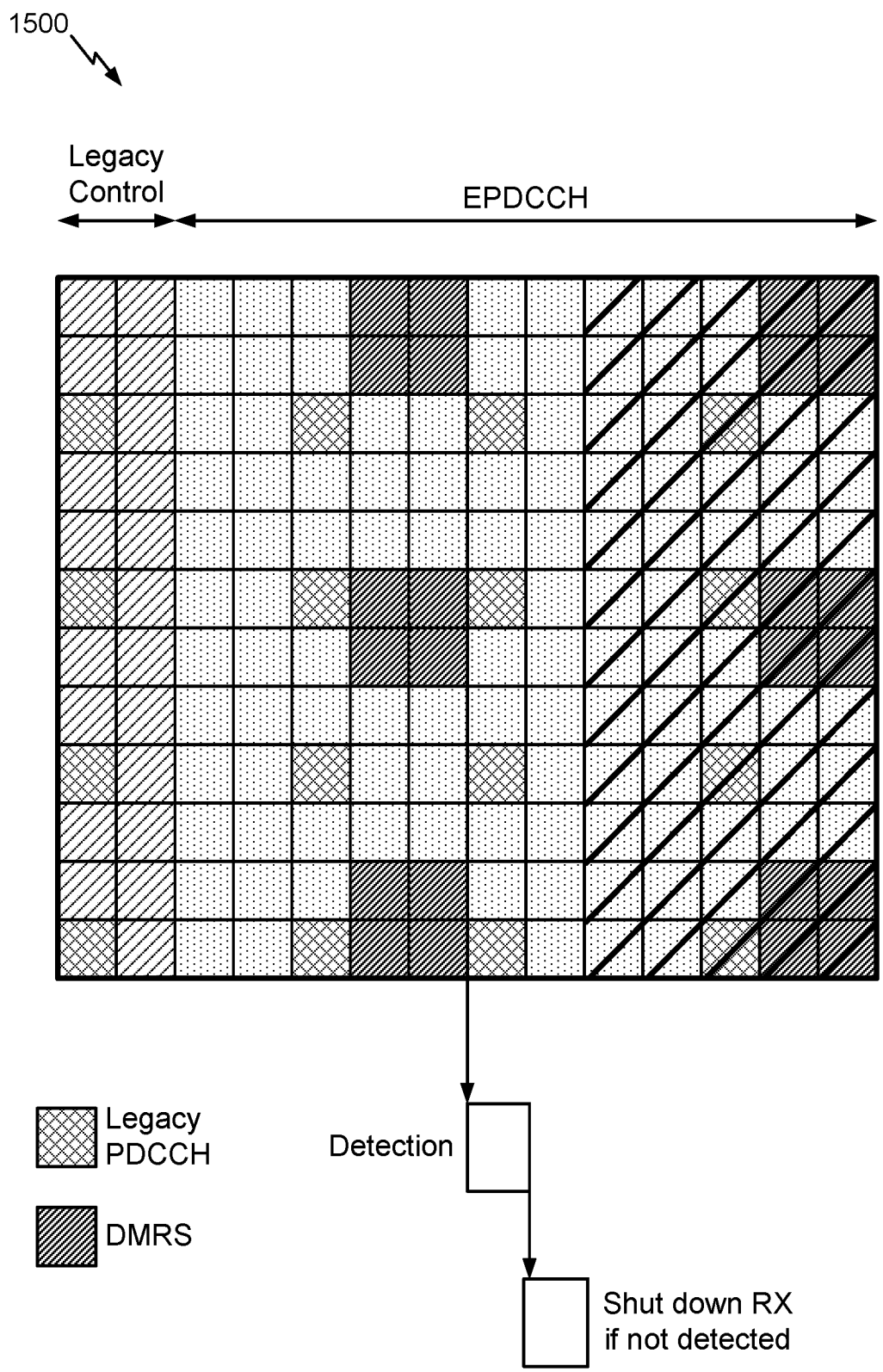
FIG. 15 is a block diagram conceptually illustrating demodulation reference signal (DMRS) detection in an exemplary subframe format with one EPDCCH repetition, in accordance with certain aspects of the present disclosure.
Figure 16:
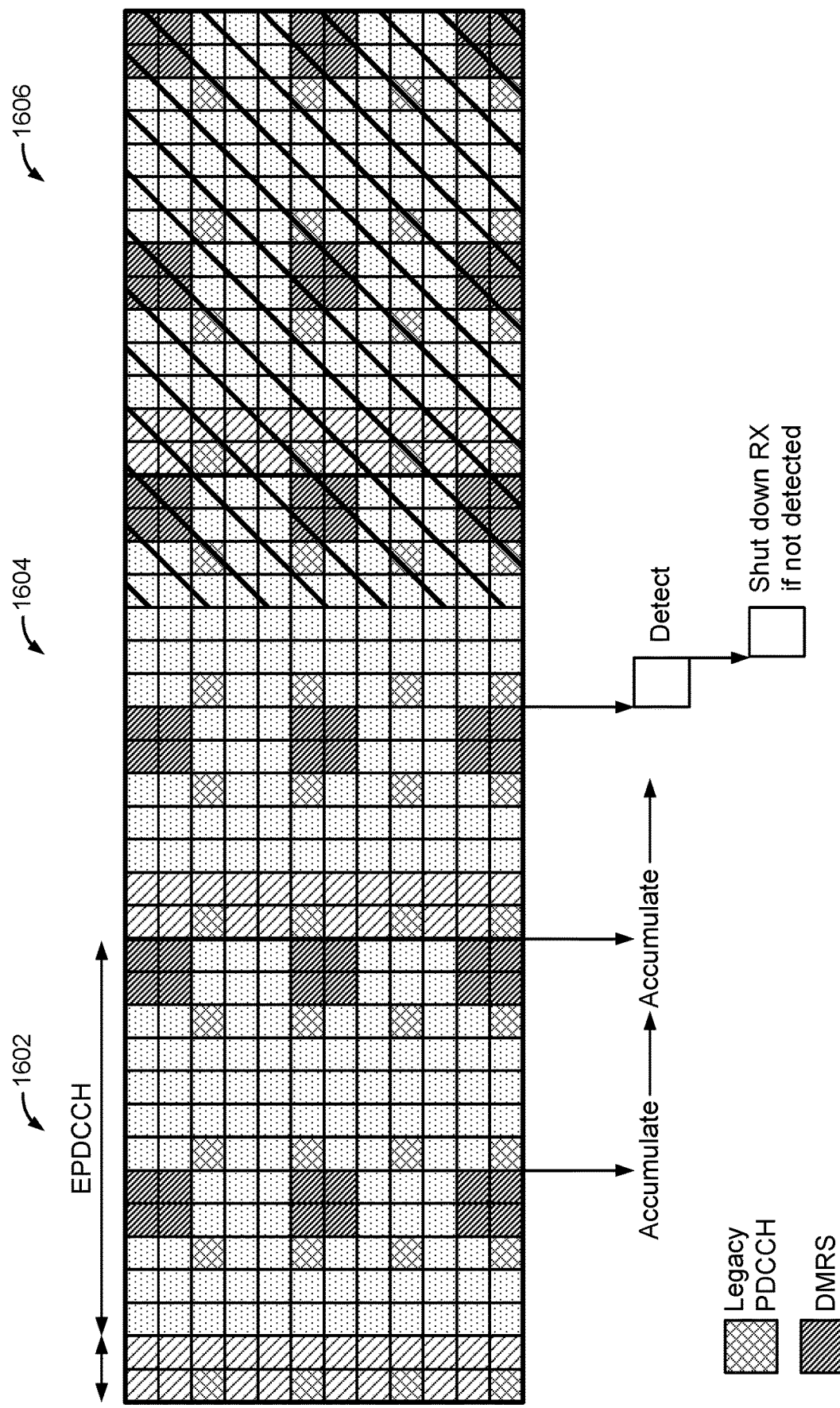
FIG. 16 is a block diagram conceptually illustrating DMRS detection in an exemplary subframe format with three EPDCCH repetitions, in accordance with certain aspects of the present disclosure.

As shown in FIGS. 15 and 16, detection may be performed at different locations in the subframe depending on the number of repetitions. As shown in FIG. 15, if one repetition is used, then if DMRS is not detected in the subframe 1500, the UE may go to micro-sleep in subframe 1500 after the detection. As shown in FIG. 16, if three repetitions are used, then the third repetition may not occur until the next subframe 1604. In this case, the UE may accumulate the first two repetitions in subframe 1602 and may not go to sleep until after the detection in subframe 1604 when the third repetition would occur.

According to certain aspects, in addition to DMRS detection or alternatively to DMRS detection, the UE may perform energy detection to determine if the control channel is present in the subframe. For example, the UE may calculate the energy in a subset of the tones in the subframe, such as a subset of tones corresponding to a decoding candidate for the control channel in the subframe.

As discussed above, based on DMRS detection and/or based on energy detection, the UE may determine whether there is a grant for the UE in the subframe and, based on whether there is a grant, the UE may determine if/when to enter the low power mode (e.g., micro sleep). The UE may select or switch between performing DMRS detection, energy detection, or both. The selection/switching may be based on the SNR regime (e.g., in low SNR, DMRS detection may be better), whether the UE is in a single-cell scenario or a multi-cell scenario, and/or based on aggregation levels monitored.

According to certain aspects, the UE may enter the low power mode (e.g., micro-sleep) if the early decodes the channel. For example, if an uplink grant is bundled for 8 subframes (e.g., subframes 0-7) and the UE early decodes the uplink grant (e.g., subframe 4), then the UE may skip the remaining subframes in the bundle (e.g., subframes 5-7). The decision to enter the low power mode, and the duration that the UE remains in the low power mode, may depend on the number of control channels (e.g., MPDCCH) that are monitored (e.g., the number of repetitions), the aggregation level of the decoded candidate, the UL/DL grant, and/or the repetition level of the decoded downlink control information (DCI).

Example New Signal/Channel Indicating Presence/Absence of Grant in a Subframe According to certain aspects, new signaling (e.g., a new channel) may be used to indicate if there is a downlink channel (e.g., a grant) for a given UE in the current subframe. This signaling/channel may be referred to as a Physical Control Presence Indicator Channel (PCPICH).

Figure 17:
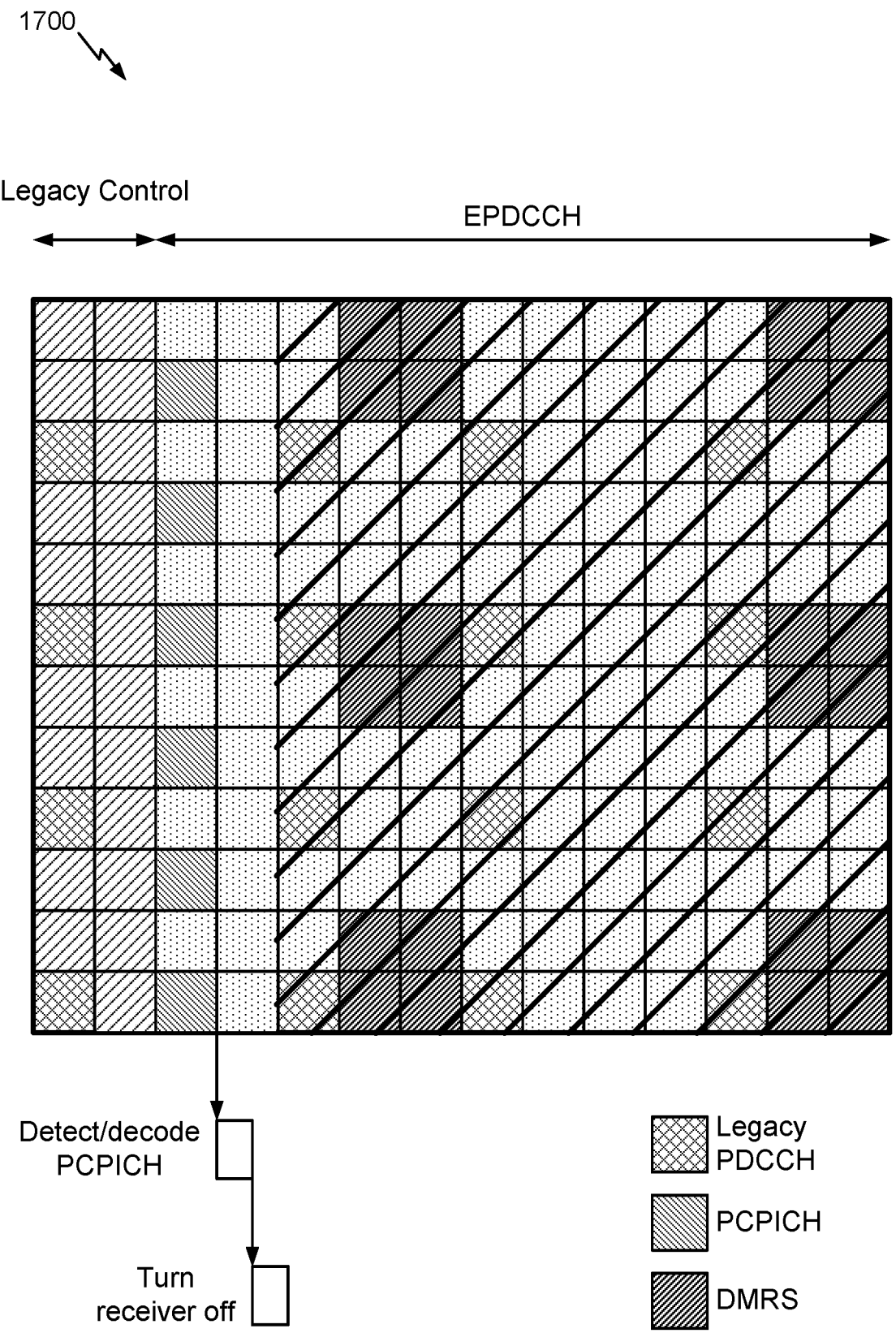
FIG. 17 is a block diagram conceptually illustrating power savings after physical control presence indicator channel (PCPICH) reception in an exemplary subframe format, in accordance with certain aspects of the present disclosure.

The PCPICH may be transmitted before the actual grant, for example, to allow the UE to skip monitoring/reception (e.g., enter the low power mode) depending on detection of the PCPICH. For example, as shown in FIG. 17, the PCPICH can be sent at the beginning of the EPDCCH in subframe 1700. Thus, the UE can decode the PCPICH, and based on the indication, the UE can turn off its receiver (e.g., enter the low power mode) in the next symbol for the remainder of the subframe 1700.

Example Location of the New Signal/Channel (PCPICH)

Figure 18:
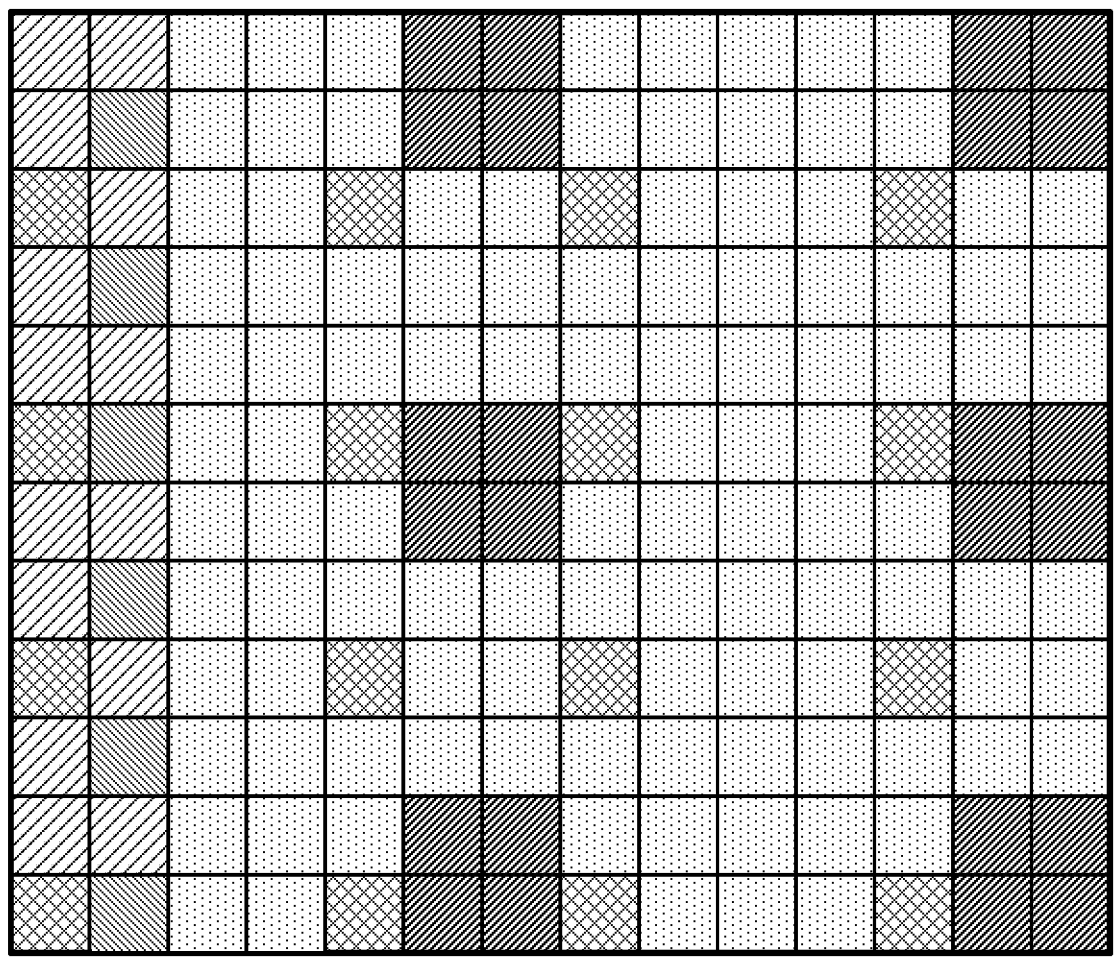
FIG. 18 is a block diagram conceptually illustrating an exemplary subframe format with PCPICH transmitted in a legacy PDCCH region of the subframe, in accordance with certain aspects of the present disclosure.

According to certain aspects, the PCPICH can be transmitted in the legacy PDCCH region of the subframe. For example, as illustrated in FIG. 18, the PCPICH is transmitted in the second symbol of subframe 1800. The BS may signal the exact position (e.g., the OFDM symbol #) of the PCPICH within the subframe. Alternatively, the UE can derive the position of the PCPICH, implicitly, from the control format indicator (CFI) field. As shown in FIG. 18, the PCPICH may puncture the legacy PDCCH. PCPICH resources may be defined in terms of legacy control channel elements (CCE). For example, all resource elements (RE) for the PCPICH may be inside a small number of CCE, such that the BS can schedule around them.

Figure 19:
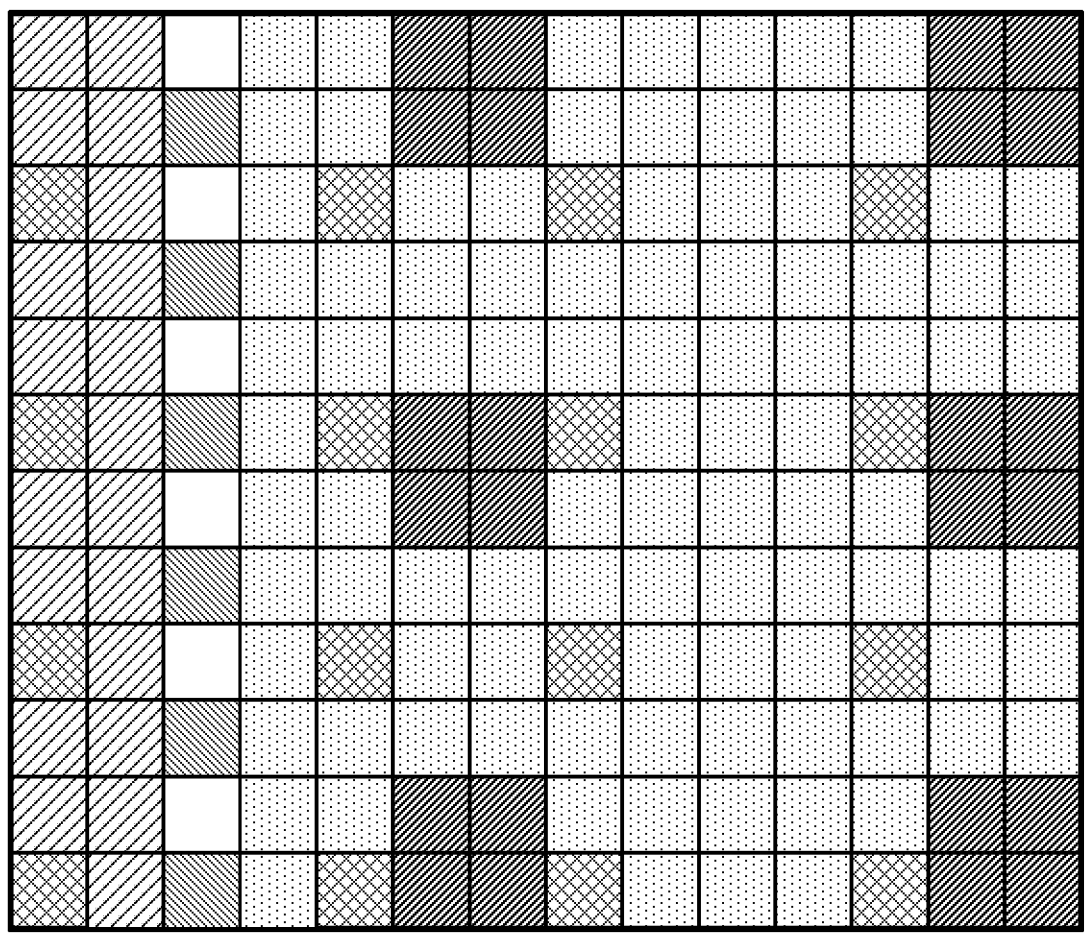
FIG. 19 is a block diagram conceptually illustrating an exemplary subframe format with PCPICH transmitted in a third symbol of the subframe, in accordance with certain aspects of the present disclosure.

Since the UE may not know the real CFI (e.g., the one in the physical control format indicator channel (PCFICH)), the BS may signal PCFICH=2 and CFI=3 in the system information block (SIB). Thus, PCPICH may be transmitted in the third OFDM symbol, as shown in FIG. 19.

Figure 20:
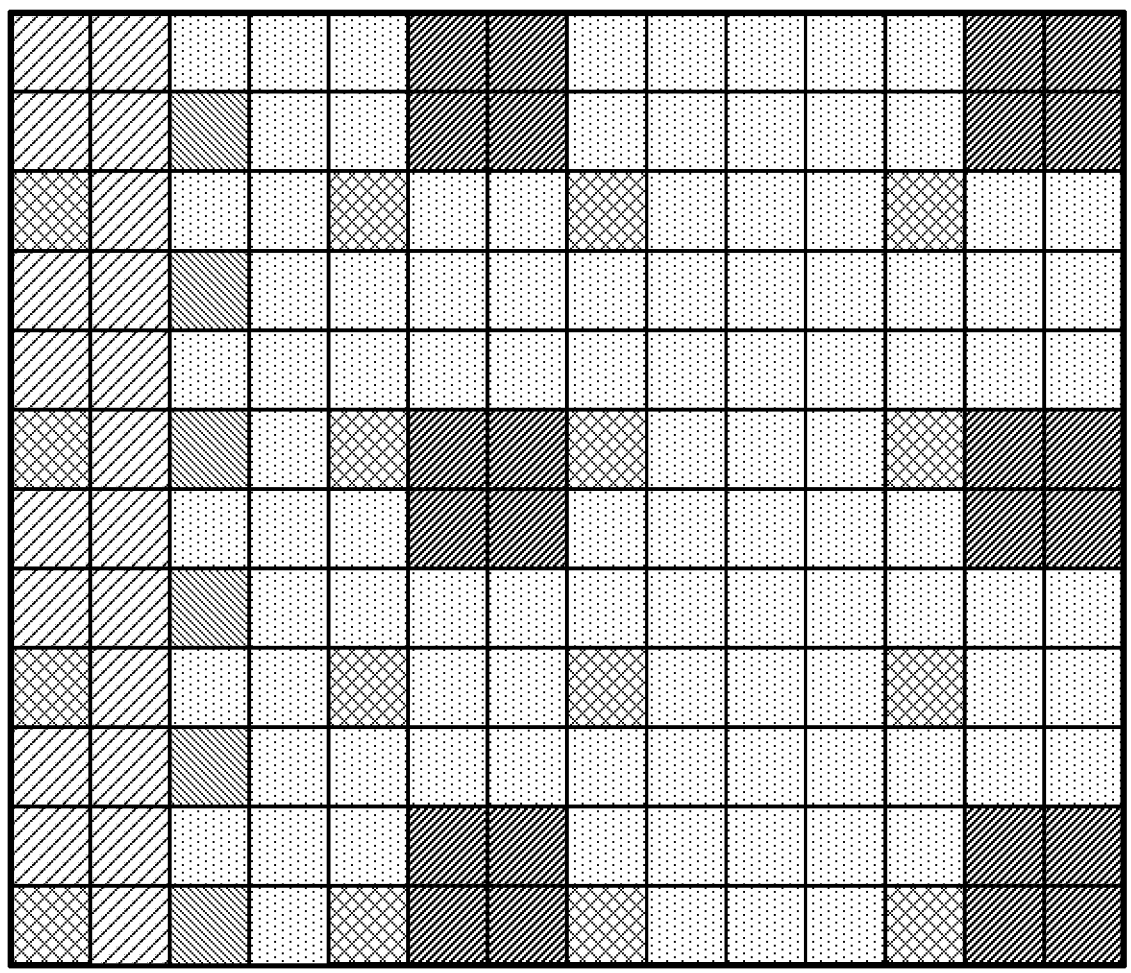
FIG. 20 is a block diagram conceptually illustrating an exemplary subframe format with PCPICH transmitted in a third symbol of the subframe where the control channel bundling size is one, in accordance with certain aspects of the present disclosure.

According to certain aspects, in the EPDCCH/MPDCCH region, a Release-13 UE may be punctured by PCPICH and a Release-14 UE monitoring PCPICH may either rate match or puncture around the PCPICH, as shown in FIG. 20. For example, rate matching may be done for low repetition levels and puncturing can be done for large repetition levels. If multiple PCPICH are transmitted (e.g., for different UEs) and rate matching is performed, each UE may rate match around its own PCPICH or, alternatively, each UE may rate match around all PCPICH (e.g., given by RRC or SIB).

Example PCPICH Groups for Monitoring

According to certain aspects, each UE may be given (e.g., assigned/signaled/indicated) a PCPICH group to monitor. For example, multiple UEs may monitor the same PCPICH. The grouping may be explicit or implicit. For example, the BS may explicitly tell the UE the index of the UE's PCPICH group or, the UE may determine its PCPICH group implicitly, for example, based on a radio network temporary identifier (RNTI). The implicit grouping can be different for different subframes. If a UE monitors different (i.e., multiple) RNTI, then the UE may monitor multiple PCPICH as well.

For transmit power control RNTI (TPC-RNTI), all UEs with the same TPC-RNTI may be in the same group to save overhead. For paging RNTI (P-RNTI), the P-RNTI may be included in the SIB, and the UE can derive the grouping based on the UE_ID. In this case, if the BS pages only Release-13 UEs, no PCPICH is transmitted. If the BS pages any Release-14 UEs that are PCPICH capable, then the BS transmits PCPICH. The PCPICH capability for P-RNTI may be stored in the mobile management entity (MME).

Example Coding/Modulation for PCPICH

In an example implementation, a coding/modulation for PCPICH may be similar to the coding/modulation for the physical hybrid automatic repeat request indicator channel (PHICH). Different PCPICH groups may use different resources. For example, different PCPICH groups may use orthogonal or quasi-orthogonal resources. The BS may perform power boosting of the PCPICH depending on pathloss.

In another example implementation, the coding/modulation for PCPICH may be similar to the coding/modulation for the PCFICH. The PCPICH groups may be jointly encoded (e.g., 5 groups), and coding/modulation/space frequency block coding (SFBC) may be performed. If five groups are signaled, then 5 bits may be used.

In yet another example implementation, there may be sixteen groups of UEs for PCPICH. The groups can be divided into meta-groups (e.g., four meta-groups of 4 PCPICH groups each). Inside each meta-group, the coding/modulation for PCPICH may be according to the above joint encoding implementation similar to PCFICH (e.g., the signal may transmit 2 bits). Between meta-groups, the coding/modulation for PCPICH may be according to the above implementation similar to PHICH (e.g., the meta-groups may have orthogonal or quasi-orthogonal resources).

According to certain aspects, orthogonal or quasi-orthogonal resources can be achieved by using a different time and/or frequency position for the PCPICH, by using a different code or sequence for the PCPICH (e.g., two different groups use two different Gold sequences, different roots, and/or different Zadoff-Chu sequences), and/or a different resource assignment and/or scrambling sequence initialization (e.g., based on a subframe number or cell ID).

According to certain aspects, multiple transmit antennas may be used for the PCPICH transmission. If multiple transmit antennas are used, different resources (e.g., different sequences or REs) can be used for different transmit antennas if sequence-based. If modulation-based, SFBC may be used.

Example Port-Mapping for PCPICH

In one example implementation, PCPICH may use the same ports as the physical broadcast channel (PBCH) (e.g., common reference signals (CRS)). In this case, SFBC may be used for PCPICH detection.

In another example implementation, PCPICH may use the same port(s) as EPDCCH. In this case, the UE may perform non-coherent detection of the PCPICH and use it as pilots if detection is successful. The PCPICH may be used as a phase reference, but may not be used as an amplitude reference to allow power boosting. The UE may not assume that the same port is used for all PRBs. Alternatively, if the UE is configured with PCPICH, the UE may assume that the same precoder is used for at least a group of PRBs.

In yet another example implementation, a separate port may be used for PCPICH. The UE may not assume anything about the PCPICH.

Example PCPICH Transmission in Subframe Bundle

According to certain aspects, PCPICH may be transmitted in a first subframe of a bundle of subframes. For example, for a bundling size of 1 for the downlink channel, the PCPICH may be transmitted in the same subframe as the downlink channel as shown in FIG. 20.

Figure 21:
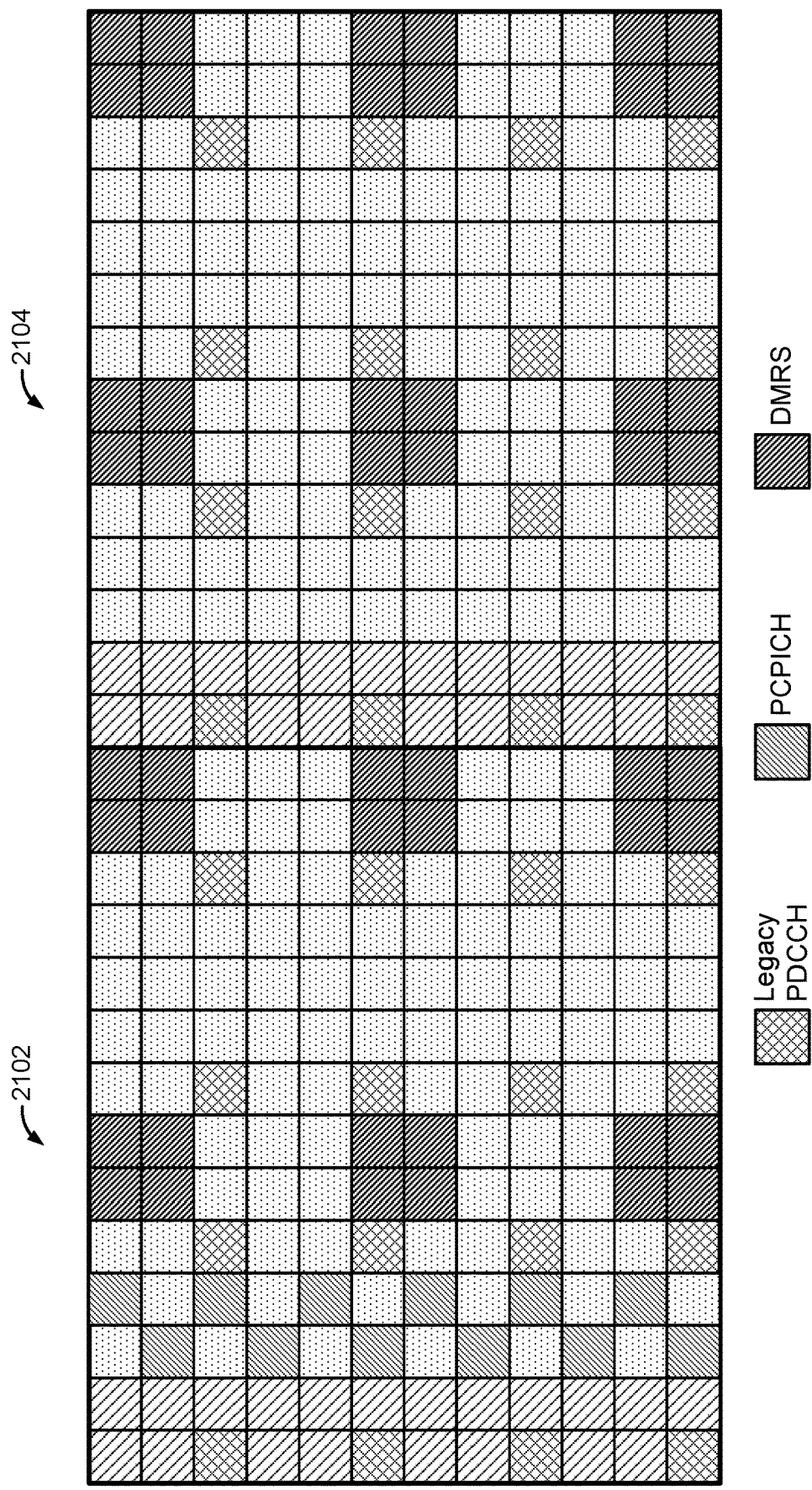
FIG. 21 is a block diagram conceptually illustrating an exemplary subframe format with PCPICH transmitted in a two symbols of the first bundled subframe where the control channel bundling size is two, in accordance with certain aspects of the present disclosure.
Figure 22:
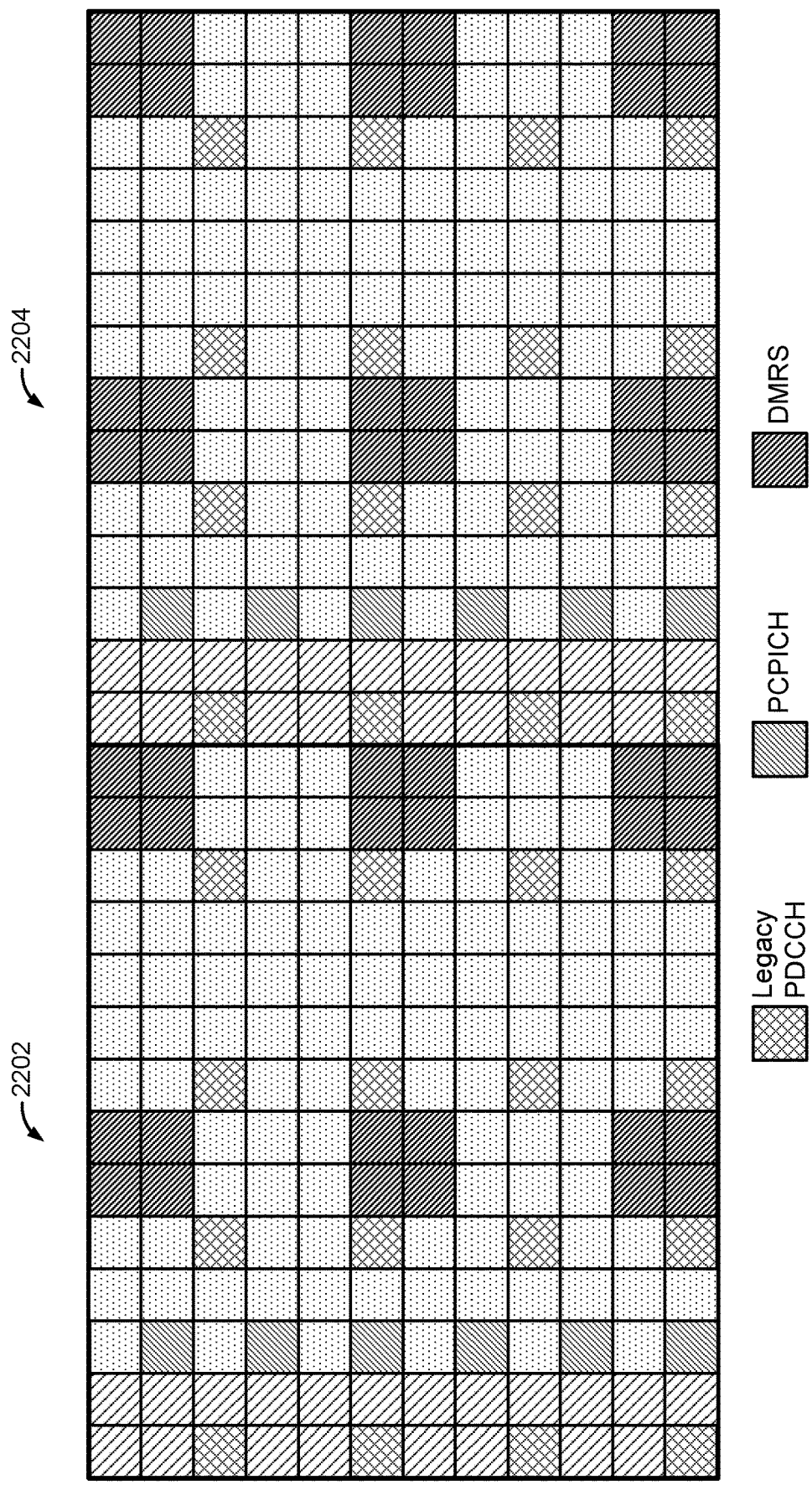
FIG. 22 is a block diagram conceptually illustrating an exemplary subframe format with PCPICH transmitted in a third symbol of the each bundled subframe where the control channel bundling size is two, in accordance with certain aspects of the present disclosure.

The number of PCPICH symbols may change with bundle size (or maximum bundle size) for the downlink channel. For example, if the bundle size for the downlink channel is two subframes, then two symbols in the first subframe of the bundle may be used for detection. As illustrated FIG. 21, the EPDCCH is bundled in subframes 2102 and 2104 and the PCPICH is transmitted in third and fourth symbols of subframe 2102. Alternatively, the number of PCPICH symbols may be RRC configured separately. In another alternative, PCPICH may be transmitted in all EPDCCH subframes of the bundle as shown in FIG. 22 where the PCPICH is transmitted in both subframe 2202 and 2204.

Other Example Enhancements

According to certain aspects, cyclic redundancy check (CRC) size may be reduced. For example, false alarms may be lower due to the PCPICH. If the PCPICH uses the lower four bits of RNTI, these four bits may be excluded from the scrambling.

According to certain aspects, resource mapping for the PCPICH can be different for localized/distributed resources, aggregation level for the EPDCCH, and the port(s) used or EPDCCH.

Figure 23:
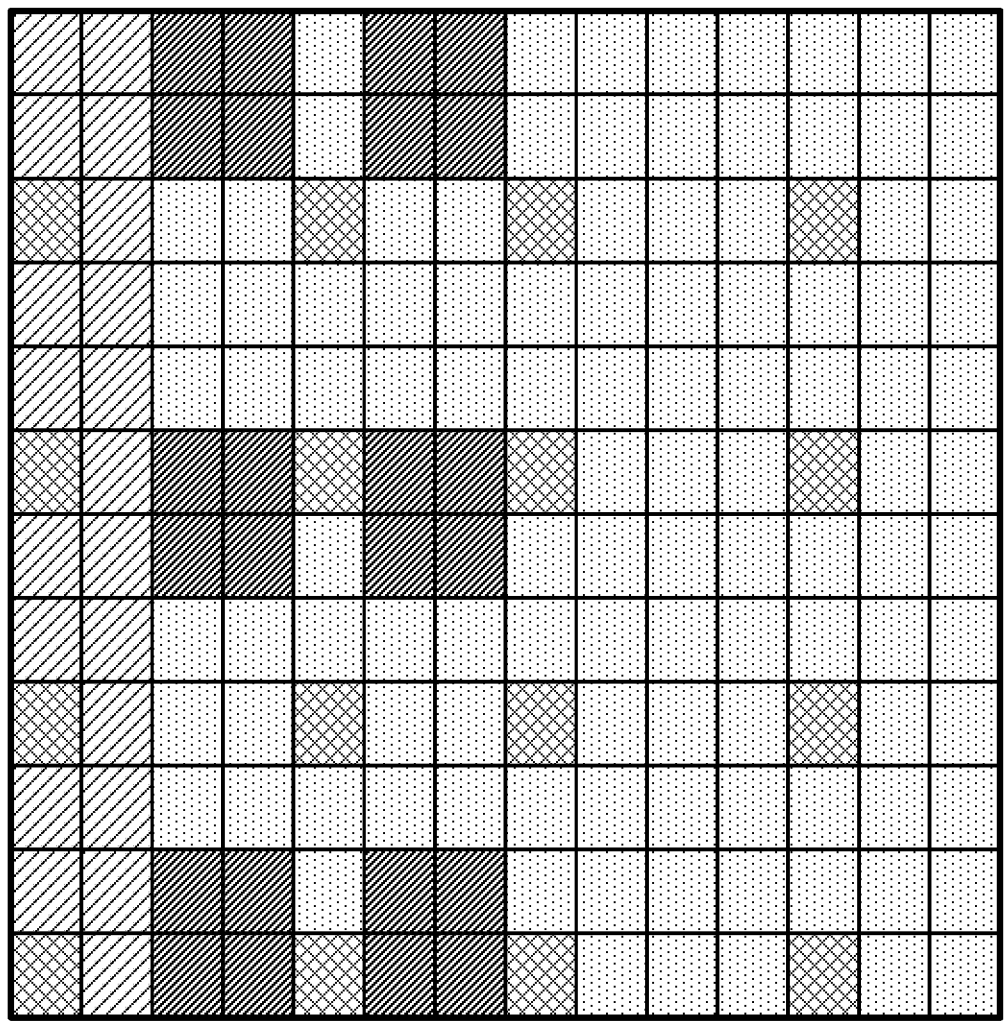
FIG. 23 is a block diagram conceptually illustrating an exemplary subframe format with DMRS transmitted with higher density at the beginning of the subframe, relative to the subframe format illustrated in FIG. 12, in accordance with certain aspects of the present disclosure.

According to certain aspects, DMRS placement can be adjusted in order to help the UE achieve power savings from downlink channel monitoring. For example, the DMRS density at the beginning of the same subframe may be increased. For example, as shown in the example subframe 2300 illustrated in FIG. 23, the DMRS density at the beginning of the subframe 2300 is increased (e.g., front-loaded), relative to regular placement (e.g., as shown in the example subframe 1200 illustrated in FIG. 12). Thus, the UE can detect DMRS before decoding. The density may be a function of the coverage enhancement (CE) mode or the repetition level monitored. In this case, the BS may not transmit PCPICH.

According to certain aspects, when semi-persistent scheduling (SPS) downlink data channel is configured, the BS may transmit data directly over PDSCH with any control associated. In this case, the UE may detect DMRS (e.g., associated to PUSCH) to see if there is anything to decode. In aspects, the DMRS can be front-loaded at the beginning of the subframe as discussed above. In some aspects, the UE may perform energy detection to see if there is any PDSCH transmitted.

According to certain aspects, the UE may monitor a large number of candidates (e.g., 20 blind decodes) to determine if there is any control. One option to reduce the number candidates to monitor may be to have a fixed candidate containing a particular DCI format that the same or similar function as PCPICH (e.g., to indicate whether the subframe includes a grant). Different UEs may monitor different candidates (e.g., similar to the PCPICH groups described above). The candidate to monitor may be hashed depending on the subframe number. The DCI format may include some details on the candidate and/or aggregation level of the true DCI. The DCI and the true DCI may be transmitted in different subframe as well. For example, the DCI may be transmitted in subframe N may indicate the presence of other DCI in subframe N+1.

The techniques described above may allow the UE to save power, for example, by allowing the UE to detect whether a control channel is present in a subframe and determine when to enter a low power mode (such as micro-sleep).

According to certain aspects, although EPDCCH is discussed throughout much this document, the techniques may also be used for MPDCCH, NPDCCH, or other downlink channels.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for determining, means for performing, means for transmitting, means for receiving, means for sending, means for signaling, means for causing, means for deriving, means for rate matching, means for puncturing, and/or means for selecting may include one or more processors, transmitters, receivers, and/or other elements of the UE 120 and/or the BS 110 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   determining whether a downlink data channel with semi-persistent scheduling (SPS) is present in a subframe, wherein the determining comprises at least one of:
     detecting whether demodulation reference signals (DMRS) are present in one or more symbols in the subframe; or
     performing energy detection on one or more frequency tones associated with a decoding candidate for the downlink data channel with SPS in the subframe; and
   entering a low power mode for a remainder of the subframe based on a determination that the downlink data channel with SPS is not present in the subframe.

2. The method of claim 1, wherein the low power mode includes skipping at least one of: monitoring of or receiving of one or more signals.

3. A method for wireless communications by a user equipment (UE), comprising:
   decoding signaling, during a subframe, including an indication that a downlink control channel is not present in the subframe;
   determining during the subframe, without decoding the downlink control channel, that the downlink control channel is not present in the subframe, wherein the determination is based on the indication in the decoded signaling; and
   entering a low power mode for a remainder of the subframe based on the determination.

4. The method of claim 3, wherein the determining comprises determining the downlink control channel is not present within one or more narrowband regions within a wider system bandwidth in the subframe.

5. The method of claim 3, wherein the downlink control channel comprises an enhanced physical downlink control channel (EPDCCH), a machine type communications physical downlink control channel (MPDCCH), or a narrowband physical downlink control channel (NPDCCH).

6. The method of claim 3, wherein the signaling including the indication that the downlink control channel is not present is received in a legacy physical downlink control channel (PDCCH) region.

7. The method of claim 6, wherein the signaling including the indication that the downlink control channel is not present punctures the legacy PDCCH or is rate-matched around the legacy PDCCH.

8. The method of claim 3, further comprising:
   receiving other signaling indicating a location of the signaling including the indication that the downlink control channel is not present in the subframe; and
   monitoring for the signaling including the indication that the downlink control channel is not present in the subframe at the indicated location.

9. The method of claim 3, further comprising:
   receiving a control format indicator (CFI) field; and
   deriving a location of the signaling including the indication that the downlink control channel is not present in the subframe based on the received CFI.

10. The method of claim 3, further comprising:
    determining a grouping associated with the signaling including the indication that the downlink control is not present in the subframe; and
    monitoring for the signaling including the indication that the downlink control is not present in the subframe based on the determined grouping.

11. The method of claim 10, wherein determining the grouping comprises at least one of:
    receiving an indication of the grouping; or
    determining the grouping based on a radio network temporary identifier (RNTI).

12. The method of claim 11, wherein the determining the grouping based on a RNTI comprises:
    determining the grouping based on a transmit power control RNTI (TPC-RNTI).

13. The method of claim 11, wherein the determining the grouping based on a RNTI comprises:
    receiving a system information block (SIB) indicating a paging RNTI (P-RNTI), and
    deriving the grouping based on an identifier of the UE.

14. The method of claim 10, further comprising:
    determining at least one of: a coding scheme associated with the grouping or a modulation order associated with the grouping; and
    monitoring for the signaling based on the determined at least one of: the coding scheme or the modulation order.

15. The method of claim 3, further comprising:
    determining a port mapping associated with the signaling including the indication that the downlink control channel is not present in the subframe; and
    monitoring for the signaling including the indication that the downlink control channel is not present in the subframe based on the determined port mapping.

16. The method of claim 3, wherein:
    the downlink control channel comprises a bundled transmission, and
    the signaling including the indication that the downlink control channel is not present in the subframe is received in at least a first subframe of the bundled transmission.

17. The method of claim 16, wherein the signaling including the indication that the downlink control channel is not present in the subframe is received in each subframe of the bundled transmission.

18. The method of claim 3, further comprising:
    performing an error check for a channel differently based on presence of the signaling including the indication that the downlink control channel is not present in the subframe in the channel.

19. The method of claim 3, wherein a resource mapping of the signaling including the indication that the downlink control channel is not present in the subframe is based, at least in part, on at least one of: whether resources for the signaling are localized or distributed, an aggregation level of a control channel, or a port used for transmitting the signaling including the indication that the downlink control channel is not present in the subframe.

20. The method of claim 3, wherein the low power mode includes skipping at least one of: monitoring of one or more signals or receiving of the one or more signals.

21. A method for wireless communications by a base station (BS), comprising:

determining a downlink control channel for a user equipment (UE) is not present in a subframe; and encoding signaling, during the subframe, including an indication that the downlink control channel is not present in the subframe and the UE can enter a low power state for a remainder of the subframe; and transmitting the signaling to the UE during subframe.

22. The method of claim 21, wherein the signaling including the indication that the downlink control channel is not present in the subframe is transmitted in a legacy physical downlink control channel (PDCCH) region.

23. The method of claim 22, wherein the signaling including the indication that the downlink control channel is not present in the subframe punctures the legacy PDCCH or is rate-matched around the legacy PDCCH.

24. The method of claim 21, further comprising:
transmitting other signaling indicating a location of the signaling including the indication that the downlink control channel is not present in the subframe.

25. The method of claim 21, further comprising:
determining a grouping associated with the signaling including the indication that the downlink control channel is not present in the subframe; and
assigning the grouping to the UE.

26. The method of claim 25, wherein determining the grouping comprises at least one of:
determining the grouping based on a radio network temporary identifier (RNTI).

27. The method of claim 26, wherein the determining the grouping based on a RNTI comprises:
determining the grouping based on a transmit power control RNTI (TPC-RNTI); and
scheduling UEs with a same TPC-RNTI for a same signaling indicating a location of the signaling including that the indication the downlink control channel is not present in the subframe.

28. The method of claim 26, wherein the determining the grouping based on a RNTI comprises:
transmitting a system information block (SIB) indicating a paging RNTI (P-RNTI),
paging one or more UEs, and
transmitting signaling indicating a location of the signaling including the indication that the downlink control channel is not present in the subframe, only if at least one UE capable of receiving the signaling is paged.

29. The method of claim 21, further comprising:
determining a port mapping associated with the signaling including the indication that the downlink control channel is not present in the subframe.

30. The method of claim 21, wherein:
the downlink control channel comprises a bundled transmission, and
the signaling including the indication that the downlink control channel is not present in the subframe is transmitted in at least a first subframe of the bundled transmission.

31. An apparatus for wireless communications by a user equipment (UE), comprising:
means for decoding signaling, during a subframe, including an indication that a downlink control channel is not present in the subframe;
means for determining during the subframe, without decoding the downlink control channel, that the downlink control channel is not present in the subframe, wherein the determination is based on the indication in the decoded signaling; and
means for entering a low power mode for a remainder of the subframe based on the determination.

32. The apparatus of claim 31, wherein the low power mode includes skipping at least one of: monitoring of or receiving of one or more signals.

33. An apparatus for wireless communications by a base station (BS), comprising:
means for determining a downlink control channel for a user equipment (UE) is not present in a subframe;
means for encoding signaling, during the subframe, including an indication that the downlink control channel is not present in the subframe and the UE can enter a low power state for a remainder of the subframe; and
means for transmitting the signaling to the UE during subframe.

34. An apparatus for wireless communications by a user equipment (UE), comprising:
at least one processor;
memory coupled to the at least one processor, the memory comprising code executable by the at least one processor to cause the UE to:
decode signaling, during a subframe, including an indication that a downlink control channel is not present in the subframe;
determine during the subframe, without decoding the downlink control channel, that the downlink control channel is not present in the subframe, wherein the determination is based on the indication in the decoded signaling; and
enter a low power mode for a remainder of the subframe based on the determination.

35. An apparatus for wireless communications by a base station (BS), comprising:
at least one processor;
memory coupled to the at least one processor, the memory comprising code executable by the at least one processor to cause the BS to:
determine a downlink control channel for a user equipment (UE) is not present in a subframe;
encode signaling, during the subframe, including an indication that the downlink control channel is not present in the subframe and the UE can enter a low power state for a remainder of the subframe; and
transmit the signaling to the UE during subframe.

36. A non-transitory computer-readable medium for wireless communications by a user equipment (UE), comprising code executable by at least one processor to cause the UE to:
decode signaling, during a subframe, including an indication that a downlink control channel is not present in the subframe;
determine during the subframe, without decoding the downlink control channel, that the downlink control channel is not present in the subframe, wherein the determination is based on the indication in the decoded signaling; and
enter a low power mode for a remainder of the subframe based on the determination.

37. A non-transitory computer-readable medium for wireless communications by a base station (BS), comprising code executable by at least one processor to cause the BS to:
determine a downlink control channel for a user equipment (UE) is not present in a subframe;

encode signaling, during the subframe, including an indication that the downlink control channel is not present in the subframe and the UE can enter a low power state for a remainder of the subframe; and transmit the signaling to the UE during subframe.

* * * * *